(12) United States Patent
Xue et al.

(10) Patent No.: US 10,855,509 B2
(45) Date of Patent: Dec. 1, 2020

(54) DATA TRANSCEIVING METHOD AND APPARATUS

(71) Applicant: Huawei Technologies Co., Ltd., Shenzhen (CN)

(72) Inventors: Lixia Xue, Beijing (CN); Yan Cheng, Beijing (CN); Hao Sun, Beijing (CN); Zheng Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/273,660

(22) Filed: Feb. 12, 2019

(65) Prior Publication Data
US 2019/0173720 A1 Jun. 6, 2019

Related U.S. Application Data

(63) Continuation of application No. PCT/CN2017/096707, filed on Aug. 10, 2017.

(30) Foreign Application Priority Data

Aug. 12, 2016 (CN) .......................... 2016 1 0666757
Mar. 24, 2017 (CN) .......................... 2017 1 0184193

(51) Int. Cl.
*H04L 27/26* (2006.01)
*H04L 5/00* (2006.01)
(Continued)

(52) U.S. Cl.
CPC ........ *H04L 27/2666* (2013.01); *H04L 5/0048* (2013.01); *H04L 25/061* (2013.01);
(Continued)

(58) Field of Classification Search
CPC . H04L 27/2666; H04L 5/0048; H04L 25/061; H04L 5/0091; H04L 5/0007;
(Continued)

(56) References Cited

U.S. PATENT DOCUMENTS

2010/0046412 A1 2/2010 Varadarajan et al.
2013/0070708 A1 3/2013 Bai et al.
(Continued)

FOREIGN PATENT DOCUMENTS

CN 102244631 A 11/2011
CN 102468951 A 5/2012
(Continued)

OTHER PUBLICATIONS

"Verizon 5G TF; Air Interface Working Group; Verizon 5th Generation Radio Access; Physical channels and modulation (Release 1)," TS V5G.211, V1.3, XP055533865, (Jun. 2016).

*Primary Examiner* — Lakeram Jangbahadur
(74) *Attorney, Agent, or Firm* — Leydig, Voit & Mayer, Ltd.

(57) ABSTRACT

A data transceiving method includes: receiving a first reference signal transmitted on a subcarrier in a target physical resource block, and performing, according to a first mapping rule, corresponding processing on the first reference signal received from the subcarrier in the target physical resource block, where the first mapping rule defines at least mapping of the first reference signal to 10 specified subcarriers in a physical resource block, none of the 10 specified subcarriers are in a DC subcarrier candidate set, and the first reference signal includes a PCRS. In the embodiments of this application, only the 10 specified subcarriers in the physical resource block that are not used as DC subcarriers are selected to transmit the first reference signal, and no additional DC subcarrier is set. In this way, a quantity of downlink subcarriers in a system does not change dynamically.

18 Claims, 6 Drawing Sheets

(51) Int. Cl.
*H04L 25/06* (2006.01)
*H04W 72/04* (2009.01)
*H04W 72/12* (2009.01)

(52) U.S. Cl.
CPC ... *H04W 72/0453* (2013.01); *H04W 72/1257* (2013.01); *H04L 5/0007* (2013.01); *H04L 5/0091* (2013.01)

(58) Field of Classification Search
CPC ..... H04L 5/0044; H04L 5/001; H04L 5/0094; H04L 5/005; H04L 1/0013; H04W 72/1257; H04W 72/0453; H04W 74/0833; H04W 72/1273
See application file for complete search history.

(56) References Cited

U.S. PATENT DOCUMENTS

| | | | |
|---|---|---|---|
| 2015/0146640 A1* | 5/2015 | Baldemair | H04L 27/2666 370/329 |
| 2015/0365926 A1 | 12/2015 | Long et al. | |
| 2017/0245278 A1* | 8/2017 | Xue | H04L 27/26 |
| 2017/0290016 A1* | 10/2017 | Yi | H04W 48/12 |

FOREIGN PATENT DOCUMENTS

| | | | |
|---|---|---|---|
| CN | 104254997 A | 12/2014 | |
| CN | 105577337 A | 5/2016 | |
| WO | 2016043555 A1 | 3/2016 | |

* cited by examiner

DATA TRANSCEIVING METHOD AND APPARATUS

CROSS-REFERENCE TO RELATED APPLICATIONS

This application is a continuation of International Application No. PCT/CN2017/096707, filed on Aug. 10, 2017, which claims priority to Chinese Patent Application No. 201610666757.3, filed on Aug. 12, 2016, and Chinese Patent Application No. 201710184193.4, filed on Mar. 24, 2017. The disclosures of the aforementioned applications are hereby incorporated by reference in their entireties.

TECHNICAL FIELD

This application relates to the field of network transmission, and in particular, to a data transceiving method and apparatus.

BACKGROUND

Currently, in a Long Term Evolution (LTE) system, a direct current subcarrier, also referred to as a DC (Direct carrier) subcarrier, is set in a bandwidth center. Because a direct current component generated by the DC subcarrier at a receive end cannot be eliminated, direct current bias interference is caused. The interference causes the receive end to fail to correctly demodulate data received on the subcarrier. To avoid impact of the DC subcarrier on data demodulation, in LTE, it is specified that no data is mapped to the DC subcarrier and the DC subcarrier is not in a resource index of a physical resource block (PRB) in a system. The physical resource block is a basic scheduling unit in data transmission and includes 12 subcarriers in frequency domain. In the LTE system, a bandwidth capability of user equipment (UE) is the same as a bandwidth capability of an eNodeB (eNodeB). Therefore, a DC subcarrier of the user equipment and a DC subcarrier of the eNodeB are the same and can be processed together.

In a future 5G system, a bandwidth capability of user equipment may be lower than a bandwidth capability of a base station. After a plurality of user equipments are connected to one system, the base station may allocate different resources to the user equipments. Consequently, locations of DC subcarriers of the user equipments are also different. If a design manner of the LTE is used, one idle subcarrier needs to be reserved at a location of each DC subcarrier (in other words, one subcarrier is added and is not used for transmission). Because actual access situations of the user equipments are different, neither locations nor quantities of the reserved idle subcarriers are determinate. This case causes an entire bandwidth of the system to dynamically change based on the access situations of the user equipments, and also causes a resource index of a PRB for the base station to dynamically change. This greatly increases complexity of a system design.

In transmission solutions for the NB-IoT and MTC in a conventional LTE system, bandwidth capabilities of user equipments are all lower than bandwidth capabilities of eNodeBs. The eNodeB does not add an additional DC subcarrier for the user equipment, but performs different implementations at a receive end by using a narrowband receiver feature of the user equipment, to avoid interference from a DC subcarrier to receiving of data and a reference signal.

Both user equipment in the NB-IoT and user equipment in the MTC are narrowband receiving user equipment, and can avoid an interference problem of a DC subcarrier at relatively low costs by performing an implementation of the user equipment. However, future user equipment may have a higher bandwidth capability than the user equipment in the NB-IoT and the user equipment in the MTC, and cannot avoid interference of the DC subcarrier by simply performing an implementation.

SUMMARY

Embodiments of this application provide a data transceiving method and apparatus. Technical solutions are as follows:

According to a first aspect, a data transceiving method is provided and applied to a receive end. When implementing the data transceiving method, the receive end first receives a first reference signal transmitted on a subcarrier in a target physical resource block, and then performs, according to a first mapping rule, corresponding processing on the first reference signal received from the subcarrier in the target physical resource block. The target physical resource block herein includes a subcarrier that carries the first reference signal. An entire system bandwidth includes a plurality of subcarriers. Each physical resource block includes 12 subcarriers. The target physical resource block is a physical resource block that includes the subcarrier carrying the first reference signal among all physical resource blocks. The first mapping rule herein defines at least mapping of the first reference signal to 10 specified subcarriers in a physical resource block. None of the 10 specified subcarriers are in a DC subcarrier candidate set. The DC subcarrier candidate set specifies numbers of carriers that are used as DC subcarriers in the physical resource block. The first reference signal includes a phase noise reference signal (phase noise compensation reference signal, PCRS). The phase noise reference signal is sent together with information, is associated with the physical resource block and an OFDM symbol that is occupied by the transmitted information, and is used to perform phase noise compensation on the transmitted information.

The first mapping rule specifies mapping of the first reference signal to a subcarrier that is not a DC subcarrier and that is in the physical resource block. This can avoid loss of the first reference signal, and ensure that the receive end can correctly demodulate the first reference signal. In addition, because no additional DC subcarrier is set, but a subcarrier in the physical resource block is used as an idle subcarrier, that is, used as a DC subcarrier, a dynamic change of a quantity of downlink subcarriers in a system is avoided.

In addition, the first reference signal may be a PCRS, and a quantity of physical resource blocks used by different user equipments may be an odd number or an even number. As a result, DC subcarriers for different user equipments correspond to different subcarrier numbers. Therefore, in this application, the DC subcarrier candidate set specifies a DC subcarrier for an odd number of physical resource blocks and a DC subcarrier for an even number of physical resource blocks. In this way, when the first reference signal is sent to all the user equipments, all the user equipments can correctly demodulate the first reference signal based on information on a subcarrier in the target physical resource block other than two subcarriers with numbers specified in the DC subcarrier candidate set.

In a first possible implementation of the first aspect, the receive end may obtain the first mapping rule in the following two manners. In a first manner, the receive end may determine the first mapping rule based on the DC subcarrier candidate set. The first mapping rule may be predefined. In this case, regardless of whether the receive end is user equipment or a base station, the receive end may obtain the predefined first mapping rule.

In a second manner, when the receive end is user equipment, the receive end may alternatively receive the first mapping rule that is notified by a base station through semi-static configuration or dynamic configuration, where the first mapping rule is determined by the base station based on the DC subcarrier candidate set. In actual implementation, the base station may be assigned permission to obtain a predefined first mapping rule while the user equipment is not given the permission to obtain the predefined first mapping rule. In this case, the base station may notify scheduled user equipment of the first mapping rule based on scheduling, so that the base station can better perform scheduling and management.

With reference to the first aspect or the first possible implementation of the first aspect, in a second possible implementation, the DC subcarrier candidate set includes a subcarrier 0 and a subcarrier 5; or the candidate set includes a subcarrier 0 and a subcarrier 6; or the candidate set includes a subcarrier 11 and a subcarrier 5; or the candidate set includes a subcarrier 11 and a subcarrier 6. In actual implementation, in a system, one of the DC subcarrier candidate sets may be used as a standard DC subcarrier candidate set, and both a base station and user equipment in the system receive and send data by using the standard DC subcarrier candidate set.

With reference to the first aspect, the first possible implementation of the first aspect, or the second possible implementation of the first aspect, in a third possible implementation, when the candidate set includes the subcarrier 0 and the subcarrier 5, the first mapping rule defines mapping of the first reference signal to a subcarrier 1, a subcarrier 2, a subcarrier 3, a subcarrier 4, a subcarrier 6, a subcarrier 7, a subcarrier 8, a subcarrier 9, a subcarrier 10, and a subcarrier 11 among 12 subcarriers in the physical resource block; when the candidate set includes the subcarrier 0 and the subcarrier 6, the first mapping rule defines mapping of the first reference signal to the subcarrier 0, a subcarrier 1, a subcarrier 2, a subcarrier 3, a subcarrier 4, a subcarrier 5, a subcarrier 7, a subcarrier 8, a subcarrier 9, a subcarrier 10, and a subcarrier 11 among 12 subcarriers in the physical resource block; when the candidate set includes the subcarrier 11 and the subcarrier 5, the first mapping rule defines mapping of the first reference signal to a subcarrier 0, a subcarrier 1, a subcarrier 2, a subcarrier 3, a subcarrier 4, a subcarrier 6, a subcarrier 7, a subcarrier 8, a subcarrier 9, and a subcarrier 10 among 12 subcarriers in the physical resource block; or when the candidate set includes the subcarrier 11 and the subcarrier 6, the first mapping rule defines mapping of the first reference signal to a subcarrier 0, a subcarrier 1, a subcarrier 2, a subcarrier 3, a subcarrier 4, a subcarrier 5, a subcarrier 7, a subcarrier 8, a subcarrier 9, and a subcarrier 10 among 12 subcarriers in the physical resource block.

The first mapping rule specifies mapping of the first reference signal to a subcarrier that is not used as a DC subcarrier and that is in the physical resource block. In this case, regardless of which subcarrier in the DC subcarrier candidate set is a DC subcarrier of user equipment, provided that the first reference signal is mapped to 10 remaining subcarriers in the target physical resource block that are not DC subcarriers, the user equipment can correctly demodulate the first reference signal based on information on the 10 subcarriers in the target physical resource block that are not DC subcarriers.

With reference to the first aspect, the first possible implementation of the first aspect, the second possible implementation of the first aspect, or the third possible implementation of the first aspect, in a fourth possible implementation, the method further includes a process of receiving data and a demodulation reference signal (DMRS). The receive end first receives data and a second reference signal from a subcarrier in a scheduled physical resource block, and then performs, according to a second mapping rule and the DC subcarrier candidate set, corresponding processing on the data and the second reference signal that are received from the subcarrier in the scheduled physical resource block. The scheduled physical resource block herein includes the subcarrier that carries the data and the second reference signal, the second mapping rule defines at least a manner of mapping the data and the second reference signal to a DC subcarrier, and the second reference signal includes a DMRS.

Because the second mapping rule specifies a rule of mapping the data and the second reference signal, it can be ensured that the receive end can correctly demodulate the data and the second reference signal. In addition, because no additional DC subcarrier is set, but a subcarrier in the physical resource block is used as an idle subcarrier, that is, used as a DC subcarrier, a dynamic change of a quantity of downlink subcarriers in a system is avoided.

With reference to any one of the first aspect, the first possible implementation of the first aspect, or the second possible implementation of the first aspect to the fourth possible implementation of the first aspect, in a fifth possible implementation, the receive end needs to obtain the second mapping rule. There may be the following three manners of obtaining the second mapping rule. In a first manner, the receive end may determine the second mapping rule based on the DC subcarrier candidate set. The second mapping rule may be predefined. In this case, regardless of whether the receive end is user equipment or a base station, the receive end may obtain the predefined second mapping rule.

In a second manner, when the receive end is user equipment, the receive end may alternatively receive the second mapping rule that is notified by a base station through semi-static configuration or dynamic configuration, where the second mapping rule is determined and sent by the base station to the user equipment based on the DC subcarrier candidate set when the base station schedules the user equipment to receive downlink data and the scheduled physical resource block includes a DC subcarrier of the user equipment. In a third manner, when the receive end is user equipment, the receive end may alternatively receive a third mapping rule and a fourth mapping rule that are notified by a base station through semi-static configuration or dynamic configuration, and determine the second mapping rule according to the third mapping rule and the fourth mapping rule, where the third mapping rule defines a manner of mapping the data to a DC subcarrier, or the fourth mapping rule defines a manner of mapping the second reference signal to a DC subcarrier.

In actual implementation, the base station may be assigned permission to obtain a predefined second mapping rule while the user equipment is not given the permission to obtain the predefined second mapping rule. In this case, the base station may notify, based on scheduling, scheduled user equipment of the rule of mapping the data and the second reference signal, so that the base station can better perform scheduling and management.

With reference to any one of the first aspect, the first possible implementation of the first aspect, or the second possible implementation of the first aspect to the fifth possible implementation of the first aspect, in a sixth possible implementation, the performing, by the receive end according to a second mapping rule and the DC subcarrier candidate set, corresponding processing on the data and the second reference signal that are received from the subcarrier in the scheduled physical resource block includes: when the second mapping rule instructs to normally map the data to a DC subcarrier, determining, by the receive end, a DC subcarrier in the physical resource block based on the DC subcarrier candidate set, and discarding data that is on the DC subcarrier in the physical resource block; or when the second mapping rule instructs to map the data to 11 subcarriers in the physical resource block in which a DC subcarrier is located, determining, by the receive end, the DC subcarrier in the physical resource block based on the DC subcarrier candidate set, and performing rate matching and data demodulation on the physical resource block on a basis of the 11 subcarriers, where none of the 11 subcarriers are DC subcarriers.

When the second mapping rule instructs to normally map the data to a DC subcarrier, it indicates that the data is mapped to all subcarriers in the scheduled physical resource block. Because data on the DC subcarrier in the physical resource block causes interference, to ensure data accuracy, the receive end may perform puncturing on the data on the DC subcarrier in the physical resource block and discard the data on the DC subcarrier in the physical resource block.

When the second mapping rule instructs to map the data to the 11 subcarriers in the physical resource block in which the DC subcarrier is located, it indicates that the data is not mapped to the DC subcarrier in the scheduled physical resource block. In this case, only data on a non-DC subcarrier in the physical resource block needs to be processed. This ensures accuracy of demodulated data.

In another possible implementation, the receive end is a base station, a transmit end is user equipment, and the method may further include: receiving, by the receive end, indication information sent by the transmit end, where the indication information is used to indicate whether the transmit end has a capability of correctly demodulating data that is modulated onto a direct current DC subcarrier; and sending, by the receive end, data to the transmit end based on the indication information, where if the indication information indicates that the transmit end does not have the capability, a subcarrier that carries the data does not include a DC subcarrier.

The user equipment reports, to the base station, whether the user equipment has the capability of correctly demodulating data that is modulated onto a DC subcarrier, and then the base station determines, based on the capability of the user equipment, whether the data can be modulated onto a DC subcarrier. In this way, user equipment that has a limited capability of processing interference from a receiving DC subcarrier can correctly demodulate the data, thereby avoiding the interference brought by the DC subcarrier to the user equipment that has the limited capability.

In another possible implementation, the receiving, by the receive end, indication information sent by the transmit end includes:

receiving, by the receive end, a random access preamble sequence or third random access information, where the random access preamble sequence or the third random access information is sent by the transmit end and includes the indication information.

The transmit end sends the indication information to the receive end during random access to a system. In this way, after the transmit end is connected to the system, the receive end may directly send the data to the transmit end based on the indication information, so that the user equipment that has the limited capability can correctly demodulate the data.

In another possible implementation, the method may further include:

when a New Radio (NR) system coexists with a Long Term Evolution (LTE) system, a subcarrier spacing in the NR system is consistent with that in the LTE system, and a frequency band in which the NR system is located is adjacent to or partially overlaps with a frequency band in which the LTE system is located, receiving, by the receive end, indication information sent by a transmit end, where the indication information is used to instruct the receive end to shift a predefined uplink subcarrier of the New Radio NR system by an odd multiple of half the subcarrier spacing in a specified direction in frequency domain, and the specified direction is a direction in which an uplink subcarrier of the Long Term Evolution LTE system is shifted relative to a center frequency.

When the NR system coexists with the LTE system, the subcarrier spacing in one of the two systems is consistent with that of the other system, and the frequency band in which one of the two systems is located is adjacent to or partially overlaps with the frequency band in which the other system is located, the base station instructs the user equipment to shift the predefined uplink subcarrier of the NR system by an odd multiple of half the subcarrier spacing in a specified direction, where the specified direction is a direction in which the uplink subcarrier of the LTE system is shifted relative to the center frequency. In this way, mutual interference caused when the NR system coexists with the LTE system can be avoided.

In another possible implementation, the receiving, by the receive end, indication information sent by a transmit end includes:

receiving, by the receive end, a system message, higher layer signaling, or downlink control information, where the system message, the higher layer signaling, or the downlink control information is sent by the transmit end and includes the indication information.

According to a second aspect, a data transceiving method is provided and applied to a transmit end. When the transmit end implements the data transceiving method, the transmit end first maps a first reference signal to a target physical resource block according to a first mapping rule, and then sends the first reference signal by using the target physical resource block to which the first reference signal is mapped. The target physical resource block herein includes a subcarrier that carries the first reference signal. An entire system bandwidth includes a plurality of subcarriers. Each physical resource block includes 12 subcarriers. The target physical resource block is a physical resource block that includes the subcarrier carrying the first reference signal among all physical resource blocks. The first mapping rule herein defines at least mapping of the first reference signal to 10 specified subcarriers in a physical resource block. None of the 10 specified subcarriers are in a DC subcarrier candidate set. The DC subcarrier candidate set specifies numbers of carriers that are used as DC subcarriers in the physical resource block. The first reference signal includes a PCRS.

The first mapping rule specifies mapping of the first reference signal to a subcarrier that is not a DC subcarrier and that is in the physical resource block. Therefore, when a receive end maps the first reference signal to a non-DC subcarrier in the target physical resource block according to the first mapping rule, loss of the first reference signal can be avoided, and it can be ensured that the receive end can correctly demodulate the first reference signal. In addition, because no additional DC subcarrier is set, but a subcarrier in the target physical resource block is used as an idle subcarrier, that is, used as a DC subcarrier, a dynamic change of a quantity of downlink subcarriers in a system is avoided.

In addition, the first reference signal may be a PCRS, and a quantity of physical resource blocks used by different user equipments may be an odd number or an even number. As a result, DC subcarriers for different user equipments correspond to different subcarrier numbers. Therefore, in this application, the DC subcarrier candidate set specifies a DC subcarrier for an odd number of physical resource blocks and a DC subcarrier for an even number of physical resource blocks. In this way, when the first reference signal is sent to all the user equipments, all the user equipments can correctly demodulate the first reference signal based on information on a subcarrier in the target physical resource block other than two subcarriers with numbers specified in the DC subcarrier candidate set.

In a first possible implementation of the second aspect, the transmit end needs to obtain the first mapping rule. There may be the following two manners of obtaining the first mapping rule. In a first manner, the transmit end may determine the first mapping rule based on the DC subcarrier candidate set. The first mapping rule may be predefined. In this case, regardless of whether the transmit end is user equipment or a base station, the transmit end may obtain the predefined first mapping rule.

When the transmit end is user equipment, when obtaining the first mapping rule, the transmit end may receive the first mapping rule that is notified by a base station through semi-static configuration or dynamic configuration, where the first mapping rule is determined by the base station based on the DC subcarrier candidate set.

In a second manner, when the transmit end is user equipment, the transmit end may alternatively receive the first mapping rule that is notified by a base station through semi-static configuration or dynamic configuration, where the first mapping rule is determined by the base station based on the DC subcarrier candidate set. In actual implementation, the base station may be assigned permission to obtain a predefined first mapping rule while the user equipment is not given the permission to obtain the predefined first mapping rule. In this case, the base station may notify scheduled user equipment of the first mapping rule based on scheduling, so that the base station can better perform scheduling and management.

With reference to the second aspect or the first possible implementation of the second aspect, in a second possible implementation, the candidate set includes a subcarrier 0 and a subcarrier 5; or the candidate set includes a subcarrier 0 and a subcarrier 6; or the candidate set includes a subcarrier 11 and a subcarrier 5; or the candidate set includes a subcarrier 11 and a subcarrier 6. In actual implementation, in a system, one of the DC subcarrier candidate sets may be used as a standard DC subcarrier candidate set, and both a base station and user equipment in the system receive and send data by using the standard DC subcarrier candidate set.

With reference to the second aspect, the first possible implementation of the second aspect, or the second possible implementation of the second aspect, in a third possible implementation, when the candidate set includes the subcarrier 0 and the subcarrier 5, the first mapping rule defines mapping of the first reference signal to a subcarrier 1, a subcarrier 2, a subcarrier 3, a subcarrier 4, a subcarrier 6, a subcarrier 7, a subcarrier 8, a subcarrier 9, a subcarrier 10, and a subcarrier 11 among 12 subcarriers in the physical resource block; when the candidate set includes the subcarrier 0 and the subcarrier 6, the first mapping rule defines mapping of the first reference signal to the subcarrier 0, a subcarrier 1, a subcarrier 2, a subcarrier 3, a subcarrier 4, a subcarrier 5, a subcarrier 7, a subcarrier 8, a subcarrier 9, a subcarrier 10, and a subcarrier 11 among 12 subcarriers in the physical resource block; when the candidate set includes the subcarrier 11 and the subcarrier 5, the first mapping rule defines mapping of the first reference signal to a subcarrier 0, a subcarrier 1, a subcarrier 2, a subcarrier 3, a subcarrier 4, a subcarrier 6, a subcarrier 7, a subcarrier 8, a subcarrier 9, and a subcarrier 10 among 12 subcarriers in the physical resource block; or when the candidate set includes the subcarrier 11 and the subcarrier 6, the first mapping rule defines mapping of the first reference signal to a subcarrier 0, a subcarrier 1, a subcarrier 2, a subcarrier 3, a subcarrier 4, a subcarrier 5, a subcarrier 7, a subcarrier 8, a subcarrier 9, and a subcarrier 10 among 12 subcarriers in the physical resource block.

The first mapping rule specifies mapping of the first reference signal to a subcarrier that is not used as a DC subcarrier and that is in the physical resource block. In this case, regardless of which subcarrier in the DC subcarrier candidate set is a DC subcarrier of user equipment, provided that the first reference signal is mapped to 10 remaining subcarriers in the target physical resource block that are not DC subcarriers, the user equipment can correctly demodulate the first reference signal based on information on the 10 subcarriers in the target physical resource block that are not DC subcarriers.

With reference to the second aspect, the first possible implementation of the second aspect, the second possible implementation of the second aspect, or the third possible implementation of the second aspect, in a fourth possible implementation, the method further includes a process of sending data and a DMRS. The transmit end maps, to a subcarrier in a scheduled physical resource block according to a second mapping rule and the DC subcarrier candidate set, data and a second reference signal that need to be sent, and sends the mapped data and the mapped second reference signal by using the subcarrier to which the data and the second reference signal are mapped in the physical resource block. The second mapping rule herein defines at least a manner of mapping the data and the second reference signal to a DC subcarrier. The second reference signal includes a demodulation reference signal DMRS.

Because the second mapping rule specifies a rule of mapping the data and the second reference signal, it can be ensured that the receive end can correctly demodulate the data and the second reference signal when the transmit end maps the data and the second reference signal according to the second mapping rule. In addition, because no additional DC subcarrier is set, but a subcarrier in the physical resource block is used as an idle subcarrier, that is, used as a DC subcarrier, a dynamic change of a quantity of downlink subcarriers in a system is avoided.

With reference to any one of the second aspect, the first possible implementation of the second aspect, or the second possible implementation of the second aspect to the fourth possible implementation of the second aspect, in a fifth possible implementation, the transmit end needs to obtain the second mapping rule. There may be the following three manners of obtaining the second mapping rule. In a first manner, the transmit end determines the second mapping rule based on the DC subcarrier candidate set. The second mapping rule may be predefined. In this case, regardless of whether the transmit end is user equipment or a base station, the transmit end may obtain the predefined second mapping rule.

In a second manner, when the transmit end is user equipment, the transmit end receives the second mapping rule that is notified by a base station through semi-static configuration or dynamic configuration, where the second mapping rule is determined and sent by the base station to the user equipment based on the DC subcarrier candidate set when the base station schedules the user equipment to send uplink data and the scheduled physical resource block includes a DC subcarrier of the user equipment. In a third manner, when the transmit end is user equipment, the transmit end receives a fourth mapping rule and a fifth mapping rule that are notified by a base station through semi-static configuration or dynamic configuration, and determines the second mapping rule according to the fourth mapping rule and the fifth mapping rule, where the fourth mapping rule defines a manner of mapping the data to a DC subcarrier, or the fifth mapping rule defines a manner of mapping the second reference signal to a DC subcarrier.

In actual implementation, the base station may be assigned permission to obtain a predefined second mapping rule while the user equipment is not given the permission to obtain the predefined second mapping rule. In this case, the base station may notify, based on scheduling, scheduled user equipment of the rule of mapping the data and the second reference signal, so that the base station can better perform scheduling and management.

With reference to any one of the second aspect, the first possible implementation of the second aspect, or the second possible implementation of the second aspect to the fifth possible implementation of the second aspect, in a sixth possible implementation, the mapping, by the transmit end, to a subcarrier in a scheduled physical resource block according to a second mapping rule and the DC subcarrier candidate set, data and a second reference signal that need to be sent includes: when the second mapping rule instructs to normally map the data to a DC subcarrier, mapping, by the transmit end to all subcarriers in the scheduled physical resource block for transmission, the data and the second reference signal that need to be sent; or when the second mapping rule instructs to map the data to 11 subcarriers in the physical resource block in which a DC subcarrier is located, performing, by the transmit end on a basis of the 11 subcarriers, rate matching on the data and the second reference signal that need to be sent, and mapping, to the 11 subcarriers in the scheduled physical resource block for transmission, information that is obtained after the rate matching, where none of the 11 subcarriers are DC subcarriers.

When the second mapping rule instructs to map the data to the 11 subcarriers in the physical resource block in which the DC subcarrier is located, and the transmit end maps the data and the second reference signal to the scheduled physical resource block according to the second mapping rule, the data is not mapped to the DC subcarrier in the scheduled physical resource block. Correspondingly, the receive end needs to process only data on a non-DC subcarrier in the physical resource block. This ensures accuracy of demodulated data.

In another possible implementation, the transmit end is user equipment, the receive end is a base station, and the method may further include:

sending, by the transmit end, indication information to the receive end, where the indication information is used to indicate whether the transmit end has a capability of correctly demodulating data that is modulated onto a direct current DC subcarrier; and receiving, by the transmit end, data that is sent by the receive end based on the indication information, where if the transmit end does not have the capability, a subcarrier that carries the data does not include a DC subcarrier.

The user equipment reports, to the base station, whether the user equipment has the capability of correctly demodulating data that is modulated onto a DC subcarrier, and then the base station determines, based on the capability of the user equipment, whether the data can be modulated onto a DC subcarrier. In this way, user equipment that has a limited capability of processing interference from a receiving DC subcarrier can correctly demodulate the data, thereby avoiding the interference brought by the DC subcarrier to the user equipment that has the limited capability.

In another possible implementation, the sending, by the transmit end, indication information to the receive end includes:

sending, by the transmit end, a random access preamble sequence or third random access information to the receive end, where the random access preamble sequence or the third random access information includes the indication information.

In another possible implementation, the method may further include:

when a New Radio NR system coexists with a Long Term Evolution LTE system, a subcarrier spacing in the NR system is consistent with that in the LTE system, and a frequency band in which the NR system is located is adjacent to or partially overlaps with a frequency band in which the LTE system is located, sending, by the transmit end, indication information to a receive end, where the indication information is used to instruct the receive end to shift a predefined uplink subcarrier of the New Radio NR system by an odd multiple of half the subcarrier spacing in a specified direction in frequency domain, and the specified direction is a direction in which an uplink subcarrier of the Long Term Evolution LTE system is shifted relative to a center frequency.

When the NR system coexists with the LTE system, the subcarrier spacing in one of the two systems is consistent with that of the other system, and the frequency band in which one of the two systems is located is adjacent to or partially overlaps with the frequency band in which the other system is located, the base station instructs the user equipment to shift the predefined uplink subcarrier of the NR system by an odd multiple of half the subcarrier spacing in a specified direction, where the specified direction is a direction in which the uplink subcarrier of the LTE system is shifted relative to the center frequency. In this way, mutual interference caused when the NR system coexists with the LTE system can be avoided.

In another possible implementation, the sending, by the transmit end, indication information to a receive end includes:

sending, by the transmit end, a system message, higher layer signaling, or downlink control information to the receive end, where the system message, the higher layer signaling, or the downlink control information includes the indication information.

According to a third aspect, a data transceiving apparatus is provided. The data transceiving apparatus includes at least one unit. Units of the information transceiving apparatus are respectively configured to perform the corresponding steps in the data transceiving method in the first aspect.

According to a fourth aspect, a data transceiving apparatus is provided. The data transceiving apparatus includes at least one unit. Units of the information transceiving apparatus are respectively configured to perform the corresponding steps in the data transceiving method in the second aspect.

According to a fifth aspect, a receiving device is provided. The receiving device includes a processor, a memory connected to the processor, and a receiver. The processor and the receiver are respectively configured to perform the corresponding steps in the data transceiving method in the first aspect.

According to a sixth aspect, a sending device is provided. The sending device includes a processor, a memory connected to the processor, and a transmitter. The processor and the transmitter are respectively configured to perform the corresponding steps in the data transceiving method in the second aspect.

According to a seventh aspect, a computer readable medium is provided. The computer readable medium stores an instruction that is used to implement the data transceiving method provided in the first aspect.

According to an eighth aspect, a computer readable medium is provided. The computer readable medium stores an instruction that is used to implement the data transceiving method provided in the second aspect.

According to a ninth aspect, a computer program product that includes an instruction is provided. When the computer program product runs on a computer, the computer performs the method described in the first aspect.

According to a tenth aspect, a computer program product that includes an instruction is provided. When the computer program product runs on a computer, the computer performs the method described in the second aspect.

DESCRIPTION OF EMBODIMENTS

To make the objectives, technical solutions, and advantages of this application clearer, the following further describes implementations of this application in detail with reference to the accompanying drawings.

Figure 1:
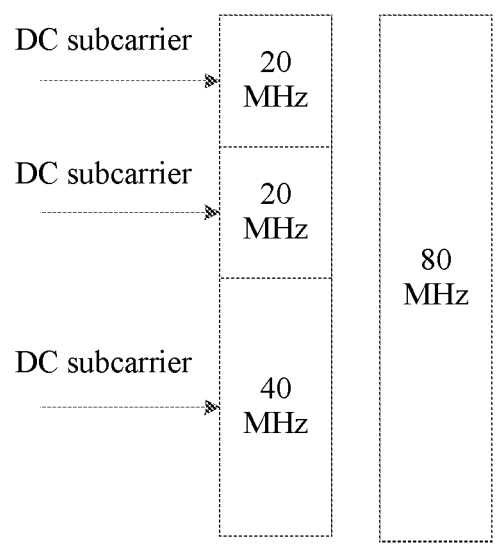
FIG. 1 is a schematic diagram in which a bandwidth of user equipment is less than a bandwidth of a base station according to some embodiments of this application.
Figure 2:
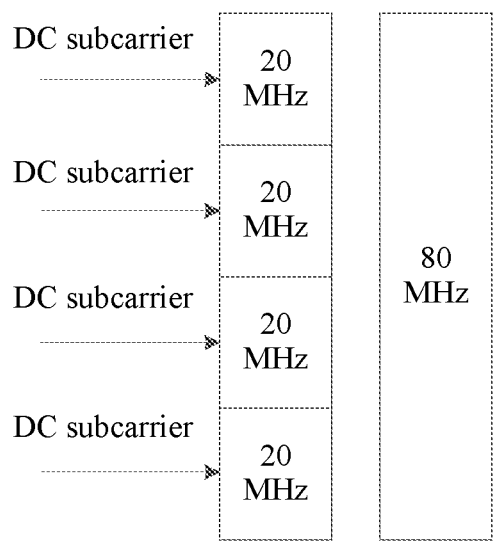
FIG. 2 is a schematic diagram in which a bandwidth of user equipment is less than a bandwidth of a base station according to other embodiments of this application.

In a future 5G system, a bandwidth of user equipment may be less than a bandwidth of a base station. Different user equipments may have different bandwidths, and quantities of user equipments that are connected to a base station are different. If a center frequency of a bandwidth is still used as a DC subcarrier, these factors cause a DC subcarrier location or quantity to be unfixed. For example, there are three user equipments in FIG. 1, one DC subcarrier is set in a center frequency of a bandwidth of each user equipment, and there are a total of three DC subcarriers for the three user equipments. In FIG. 2, there are four user equipments, and there are a total of four DC subcarriers for the four user equipments. Apparently, according to a conventional DC subcarrier setting manner, different quantities of user equipments or different bandwidths occupied by user equipments may lead to different quantities and locations of DC subcarriers.

To adapt to the future 5G system in which the bandwidth of the user equipment is smaller than the bandwidth of the base station, this embodiment of this application proposes a new DC subcarrier design rule for an LTE system. This design rule no longer introduces an empty subcarrier as a DC subcarrier in the system. Instead, a DC subcarrier candidate set is selected within an existing valid bandwidth of the system, that is, a subcarrier in a scheduled PRB is specified as a DC subcarrier. This avoids a dynamic change of a system bandwidth caused when a redundant empty subcarrier is introduced as a DC subcarrier.

Figure 3:
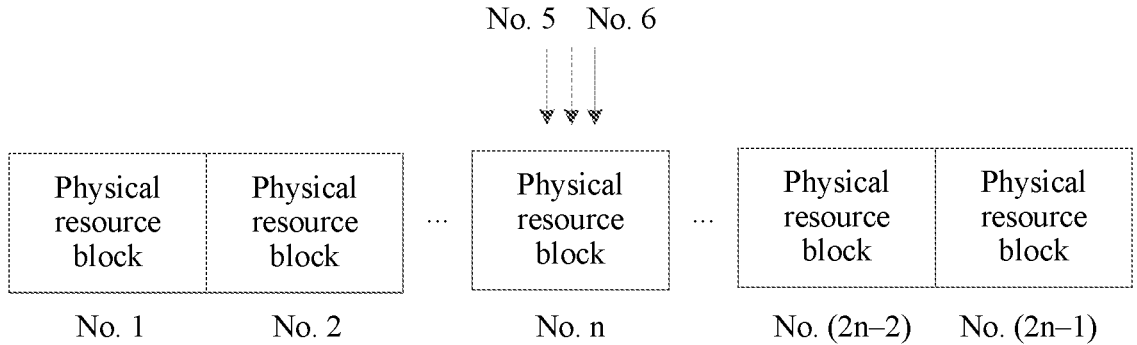
FIG. 3 is a schematic diagram of determining a DC subcarrier candidate set according to an embodiment of this application.

According to bandwidth analysis, if an even number of PRBs (each PRB includes 12 subcarriers) are occupied by an access bandwidth of the user equipment, a center frequency is located on a border of two PRBs. In other words, the center frequency is located between a subcarrier 0 and a subcarrier 11. The user equipment may enable, through an implementation, an actual center frequency to be located in either the subcarrier 0 or the subcarrier 11, as shown in FIG. 3.

Figure 4:
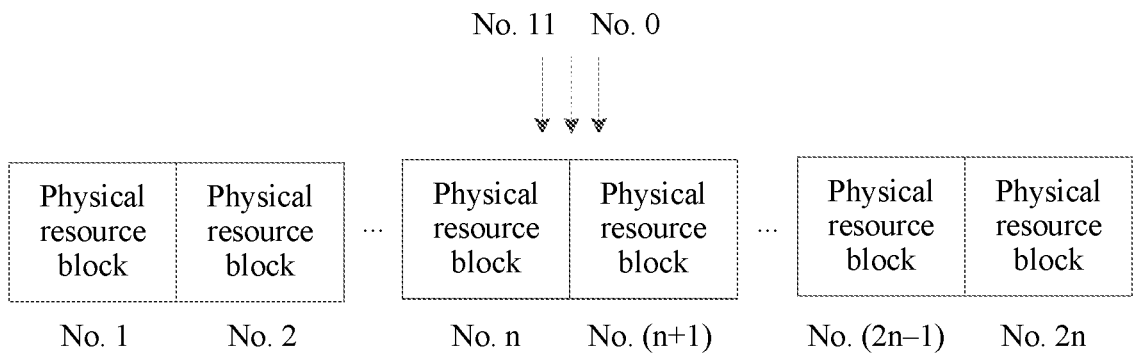
FIG. 4 is a schematic diagram of determining a DC subcarrier candidate set according to another embodiment of this application.

However, if an odd number of PRBs are occupied by an access bandwidth of the user equipment, a center frequency is located in a center of a central PRB. In other words, the center frequency is located in the middle of a subcarrier 5 and a subcarrier 6. The user equipment may enable, through an implementation, an actual center frequency to be located in either the subcarrier 5 or the subcarrier 6, as shown in FIG. 4.

In this way, it can be determined that a DC subcarrier candidate set for any access user equipment is certainly one of four DC subcarrier candidate sets. The candidate set includes a subcarrier 0 and a subcarrier 5; or includes a subcarrier 0 and a subcarrier 6; or includes a subcarrier 11 and a subcarrier 5; or includes a subcarrier 11 and a subcarrier 6.

Four DC subcarrier candidate sets are set in this application. In actual implementation, one of the candidate sets may be determined, and may be known to both the user equipment and the base station through predefinition or in another manner. Subsequent data sending or receiving processes are all implemented based on the determined candidate set.

Figure 5:
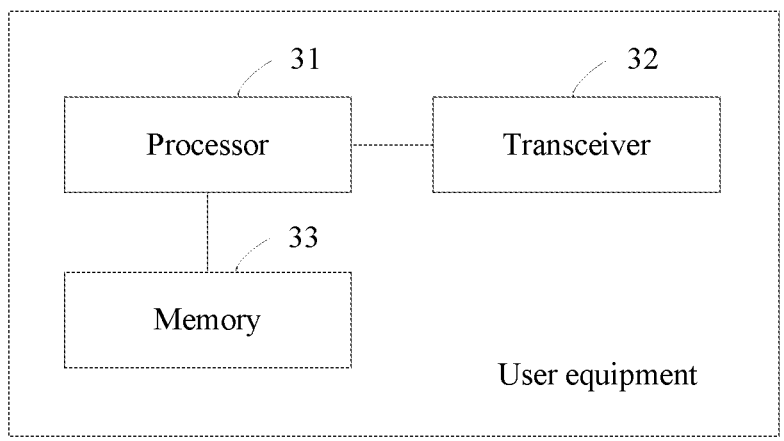
FIG. 5 is a schematic structural diagram of user equipment according to an embodiment of this application.

For a structure of user equipment, refer to FIG. 5. The user equipment includes a processor 31, a transceiver 32, and a memory 33.

The processor 31 includes one or more processing cores. The processor 31 runs a software program to perform various function applications and process data.

The transceiver 32 may be configured to communicate with another device, for example, may communicate with a base station.

The memory 33 is connected to the processor 31. For example, the memory 33 may be connected to the processor 31 by using a bus. The memory 33 may be configured to store the software program.

The memory 33 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art may understand that the structure of the user equipment shown in FIG. 5 does not constitute a limitation on the user equipment, more or fewer parts than those shown in the figure may be included, some parts may be combined, or the parts may be arranged in a different way.

Figure 6:
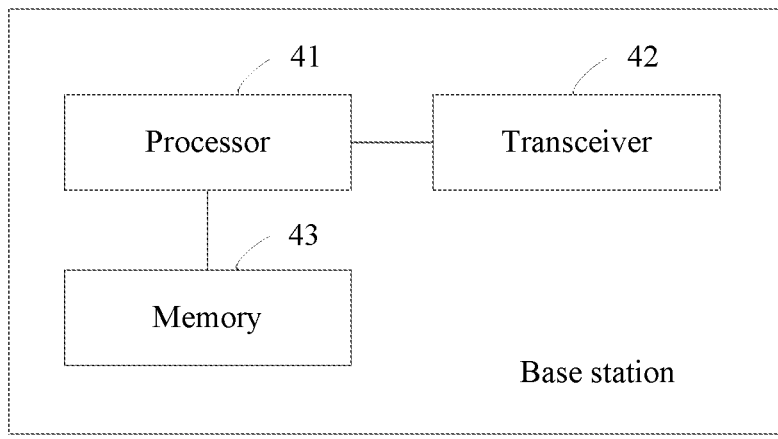
FIG. 6 is a schematic structural diagram of a base station according to an embodiment of this application.

For a structure of a base station, refer to FIG. 6. The base station includes a processor 41, a transceiver 42, and a memory 43.

The processor 41 includes one or more processing cores. The processor 41 runs a software program to perform various function applications and process data.

The transceiver 42 may be configured to communicate with another device, for example, may communicate with user equipment.

The memory 43 is connected to the processor 41. For example, the memory 43 may be connected to the processor 41 by using a bus. The memory 43 may be configured to store the software program.

The memory 43 may be implemented by any type of volatile or non-volatile storage device or a combination thereof, for example, a static random access memory, an electrically erasable programmable read-only memory, an erasable programmable read-only memory, a programmable read-only memory, a read-only memory, a magnetic memory, a flash memory, a magnetic disk, or an optical disc.

A person skilled in the art may understand that the structure of the base station shown in FIG. 6 does not constitute a limitation on the base station, more or fewer parts than those shown in the figure may be included, some parts may be combined, or the parts may be arranged in a different way.

A PCRS transceiving process and a data transceiving process are separately described below by using FIG. 7, FIG. 8, FIG. 9, and FIG. 11.

Figure 7:
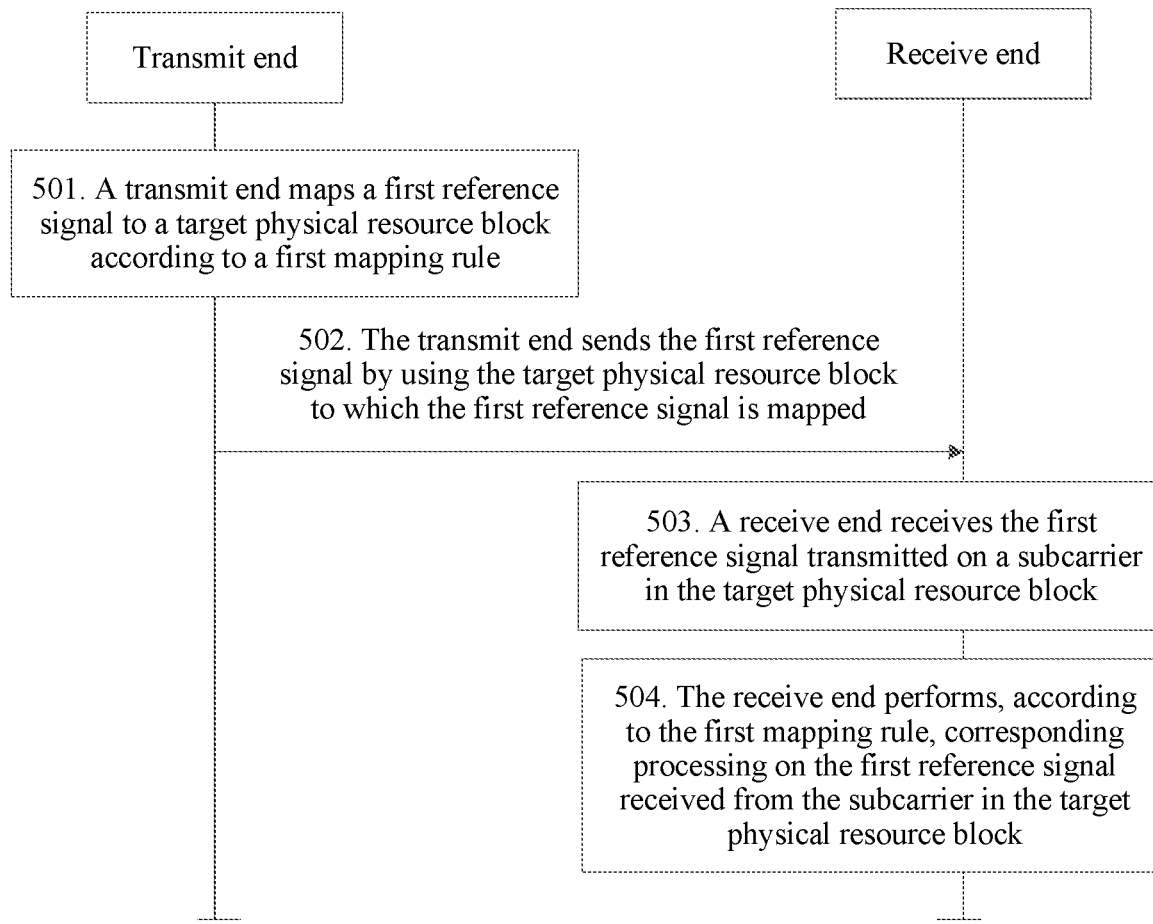
FIG. 7 is a flowchart of a data transceiving method according to an embodiment of this application.

FIG. 7 is a flowchart of a data transceiving method according to an embodiment of this application. A receive end in FIG. 7 may be user equipment that receives downlink data or may be a base station that receives uplink data. When the receive end is user equipment, a corresponding transmit end is a base station. When the receive end is a base station, a corresponding transmit end is user equipment. For a structure of the user equipment, refer to FIG. 5. For a structure of the base station, refer to FIG. 6. The data transceiving method includes the following steps.

501. The transmit end maps a first reference signal to a target physical resource block according to a first mapping rule.

The target physical resource block includes a subcarrier that carries the first reference signal. In other words, an entire system bandwidth includes a plurality of subcarriers. Each physical resource block includes 12 subcarriers. The target physical resource block is a physical resource block that includes the subcarrier carrying the first reference signal among all physical resource blocks.

The first mapping rule defines at least mapping of the first reference signal to 10 specified subcarriers in a physical resource block. None of the 10 specified subcarriers are in a DC subcarrier candidate set. The first reference signal herein may include a PCRS or the like.

The first mapping rule herein specifies a manner of mapping a PCRS of each user equipment in a system.

Before using the first mapping rule, the transmit end needs to first obtain the first mapping rule. There may be at least the following two manners of obtaining the first mapping rule by the transmit end.

In a first manner, the transmit end determines the first mapping rule based on the DC subcarrier candidate set.

When the transmit end is a base station, the base station may determine the first mapping rule based on the DC subcarrier candidate set. This may be performed by the processor 41 in FIG. 6. When the transmit end is user equipment, the user equipment may determine the first mapping rule based on the DC subcarrier candidate set through predefinition. This may be performed by the processor 31 in FIG. 5.

In actual implementation, after a DC subcarrier candidate set is determined, each of a base station and user equipment may be notified of the DC subcarrier candidate set through predefinition. Correspondingly, the base station or the user equipment may determine the first mapping rule based on the DC subcarrier candidate set.

For example, when the DC subcarrier candidate set includes a subcarrier 0 and a subcarrier 5, the first mapping rule determined based on the DC subcarrier candidate set defines mapping of the first reference signal to a subcarrier 1, a subcarrier 2, a subcarrier 3, a subcarrier 4, a subcarrier 6, a subcarrier 7, a subcarrier 8, a subcarrier 9, a subcarrier 10, and a subcarrier 11 among 12 subcarriers in the physical resource block. In other words, the first mapping rule defines mapping of the first reference signal to subcarriers that are neither the subcarrier 0 nor the subcarrier 5.

In this way, when sending the first reference signal by using a scheduled resource block, the base station or the user equipment may map the first reference signal to subcarriers corresponding to some of the foregoing subcarrier numbers that are specified by the first mapping rule.

Similarly, the first mapping rule varies with the DC subcarrier candidate set on which the first mapping rule is based.

For example, when the candidate set includes a subcarrier 0 and a subcarrier 6, the first mapping rule defines mapping of the first reference signal to the subcarrier 0, a subcarrier 1, a subcarrier 2, a subcarrier 3, a subcarrier 4, a subcarrier 5, a subcarrier 7, a subcarrier 8, a subcarrier 9, a subcarrier 10, and a subcarrier 11 among 12 subcarriers in the physical resource block. In other words, the first mapping rule defines mapping of the first reference signal to subcarriers that are neither the subcarrier 0 nor the subcarrier 6.

For another example, when the candidate set includes a subcarrier 11 and a subcarrier 5, the first mapping rule defines mapping of the first reference signal to a subcarrier 0, a subcarrier 1, a subcarrier 2, a subcarrier 3, a subcarrier 4, a subcarrier 6, a subcarrier 7, a subcarrier 8, a subcarrier 9, and a subcarrier 10 among 12 subcarriers in the physical resource block. In other words, the first mapping rule defines mapping of the first reference signal to subcarriers that are neither the subcarrier 11 nor the subcarrier 5.

For another example, when the candidate set includes a subcarrier 11 and a subcarrier 6, the first mapping rule defines mapping of the first reference signal to a subcarrier 0, a subcarrier 1, a subcarrier 2, a subcarrier 3, a subcarrier 4, a subcarrier 5, a subcarrier 7, a subcarrier 8, a subcarrier 9, and a subcarrier 10 among 12 subcarriers in the physical resource block. In other words, the first mapping rule defines mapping of the first reference signal to subcarriers that are neither the subcarrier 11 nor the subcarrier 6.

In a second manner, when the receive end is user equipment, the transmit end receives the first mapping rule that is notified by a base station through semi-static configuration or dynamic configuration, where the first mapping rule is determined by the base station based on the DC subcarrier candidate set. When the receive end is user equipment, this manner may be implemented by the transceiver 32 in FIG. 5.

The base station may determine the first mapping rule based on the DC subcarrier candidate set. After determining the first mapping rule, the base station may further notify the user equipment of the first mapping rule through semi-static configuration or dynamic configuration.

The semi-static configuration manner herein means that the base station first notifies the user equipment of the first mapping rule at an initial access stage of the user equipment, and may not notify the user equipment of the first mapping rule again in a subsequent process, or notifies the user equipment of the first mapping rule again after a period of time during which the first mapping rule keeps valid, or notifies the user equipment of the first mapping rule at a time interval in a subsequent process, or notifies the user equipment of the first mapping rule again when some specified events are triggered.

The dynamic configuration manner herein means that the base station first notifies the user equipment of the first mapping rule each time the base station needs to send the first reference signal to the user equipment.

In actual application, the base station may alternatively notify the user equipment of the first mapping rule in another notification manner. Examples are not further enumerated herein.

For example, the DC subcarrier candidate set includes the subcarrier 0 and the subcarrier 5, and the first mapping rule defines mapping of the first reference signal to the subcarriers 1, 2, 3, 4, 6, 7, 8, 9, 10, and 11 in the target physical resource block. When the base station or the user equipment needs to map the first reference signal to the target physical resource block, the first reference signal is mapped to the subcarrier 1, the subcarrier 2, the subcarrier 3, the subcarrier 4, the subcarrier 6, the subcarrier 7, the subcarrier 8, the subcarrier 9, the subcarrier 10, and the subcarrier 11 in the target physical resource block according to the first mapping rule.

For example, the DC subcarrier candidate set includes the subcarrier 0 and the subcarrier 6, and the first mapping rule defines mapping of the first reference signal to the subcarriers 1, 2, 3, 4, 5, 7, 8, 9, 10, and 11 in the target physical resource block. When the base station or the user equipment needs to map the first reference signal to the target physical resource block, the first reference signal is mapped to the subcarrier 1, the subcarrier 2, the subcarrier 3, the subcarrier 4, the subcarrier 5, the subcarrier 7, the subcarrier 8, the subcarrier 9, the subcarrier 10, and the subcarrier 11 in the target physical resource block according to the first mapping rule.

For example, the DC subcarrier candidate set includes the subcarrier 11 and the subcarrier 5, and the first mapping rule defines mapping of the first reference signal to the subcarriers 0, 1, 2, 3, 4, 6, 7, 8, 9, and 10 in the target physical resource block. When the base station or the user equipment needs to map the first reference signal to the target physical resource block, the first reference signal is mapped to the subcarrier 0, the subcarrier 1, the subcarrier 2, the subcarrier 3, the subcarrier 4, the subcarrier 6, the subcarrier 7, the subcarrier 8, the subcarrier 9, and the subcarrier 10 in the target physical resource block according to the first mapping rule.

For example, the DC subcarrier candidate set includes the subcarrier 11 and the subcarrier 6, and the first mapping rule defines the mapping of the first reference signal to the subcarriers 0, 1, 2, 3, 4, 5, 7, 8, 9, and 10 in the target physical resource block. When the base station or the user equipment needs to map the first reference signal to the target physical resource block, the first reference signal is mapped to the subcarrier 0, the subcarrier 1, the subcarrier 2, the subcarrier 3, the subcarrier 4, the subcarrier 5, the subcarrier 7, the subcarrier 8, the subcarrier 9, and the subcarrier 10 in the target physical resource block according to the first mapping rule.

When the transmit end is user equipment, step 501 may be performed by the processor 31 in FIG. 5. When the transmit end is a base station, step 501 may be performed by the processor 41 in FIG. 6.

502. The transmit end sends the first reference signal by using the target physical resource block to which the first reference signal is mapped.

When the transmit end is user equipment, step 502 may be performed by the transceiver 32 in FIG. 5. When the transmit end is a base station, step 502 may be performed by the transceiver 42 in FIG. 6.

503. The receive end receives the first reference signal transmitted on a subcarrier in the target physical resource block.

When the receive end is user equipment, step 503 may be performed by the transceiver 32 in FIG. 5. When the receive end is a base station, step 503 may be performed by the transceiver 42 in FIG. 6.

504. The receive end performs, according to the first mapping rule, corresponding processing on the first reference signal received from the subcarrier in the target physical resource block.

Similarly, when the receive end needs to obtain the first mapping rule, there are the following two manners of obtaining the first mapping rule by the receive end.

In a first manner, the receive end determines the first mapping rule based on the DC subcarrier candidate set. When the receive end is user equipment, this step may be performed by the processor 31 in FIG. 5. When the receive end is a base station, this step may be performed by the processor 41 in FIG. 6.

In a second manner, when the transmit end is user equipment, the receive end receives the first mapping rule that is notified by a base station through semi-static configuration or dynamic configuration, where the first mapping rule is determined by the base station based on the DC subcarrier candidate set. When the receive end is user equipment, this manner may be implemented by the transceiver 32 in FIG. 5.

In an example in which the transmit end is a base station and the receive end is user equipment, the base station determines the first mapping rule based on the DC subcarrier candidate set, and maps the first reference signal to the subcarrier in the target physical resource block according to the first mapping rule; correspondingly, the user equipment determines the first mapping rule based on the DC subcarrier candidate set, and performs, according to the first mapping rule, corresponding processing on the first reference signal received from the subcarrier in the target physical resource block. Alternatively, the base station determines the first mapping rule based on the DC subcarrier candidate set, and notifies the user equipment of the first mapping rule; the base station maps the first reference signal to the subcarrier in the target physical resource block according to the first mapping rule; and the user equipment performs, according to the first mapping rule, corresponding processing on the first reference signal received from the subcarrier in the target physical resource block.

In an example in which the transmit end is user equipment and the receive end is a base station, the user equipment determines the first mapping rule based on the DC subcarrier candidate set, and maps the first reference signal to the subcarrier in the target physical resource block according to the first mapping rule; correspondingly, the base station determines the first mapping rule based on the DC subcarrier candidate set, and performs, according to the first mapping rule, corresponding processing on the first reference signal received from the subcarrier in the target physical resource block. Alternatively, the base station determines the first mapping rule based on the DC subcarrier candidate set, and notifies the user equipment of the first mapping rule; the user equipment maps the first reference signal to the subcarrier in the target physical resource block according to the first mapping rule; and the base station performs, according to the first mapping rule, corresponding processing on the first reference signal received from the subcarrier in the target physical resource block.

When the receive end is user equipment, step 504 may be performed by the processor 31 in FIG. 5.

When the receive end is a base station, step 504 may be performed by the processor 41 in FIG. 6.

In conclusion, according to the data transceiving method provided in this embodiment of this application, the first mapping rule specifies mapping of the first reference signal to a subcarrier that is not a DC subcarrier in the physical resource block. This can avoid loss of the first reference signal, and ensure that the receive end can correctly demodulate the first reference signal. In addition, because no additional DC subcarrier is set, but a subcarrier in the physical resource block is used as an idle subcarrier, that is, used as a DC subcarrier, a dynamic change of a quantity of downlink subcarriers in a system is avoided.

In addition, the first reference signal may be a PCRS, and a quantity of physical resource blocks used by different user equipments may be an odd number or an even number. As a result, DC subcarriers for different user equipments correspond to different subcarrier numbers. Therefore, in this application, the DC subcarrier candidate set specifies a DC subcarrier for an odd number of physical resource blocks and a DC subcarrier for an even number of physical resource blocks. In this way, provided that the first reference signal is sent to all the user equipments on a subcarrier other than two subcarriers with numbers specified in the DC subcarrier candidate set, all the user equipments can correctly demodulate the first reference signal based on information on the subcarrier in the target physical resource block.

In actual implementation, the base station may be assigned permission to obtain a predefined first mapping rule while the user equipment is not given the permission to obtain the predefined first mapping rule. In this case, the base station may notify scheduled user equipment of the first mapping rule based on scheduling, so that the base station can better perform scheduling and management.

In actual application, the base station or the user equipment may determine a data sending rule based on the DC subcarrier candidate set, and perform corresponding data receiving processing according to the rule. For specific implementation, refer to steps shown in FIG. 8.

Figure 8:
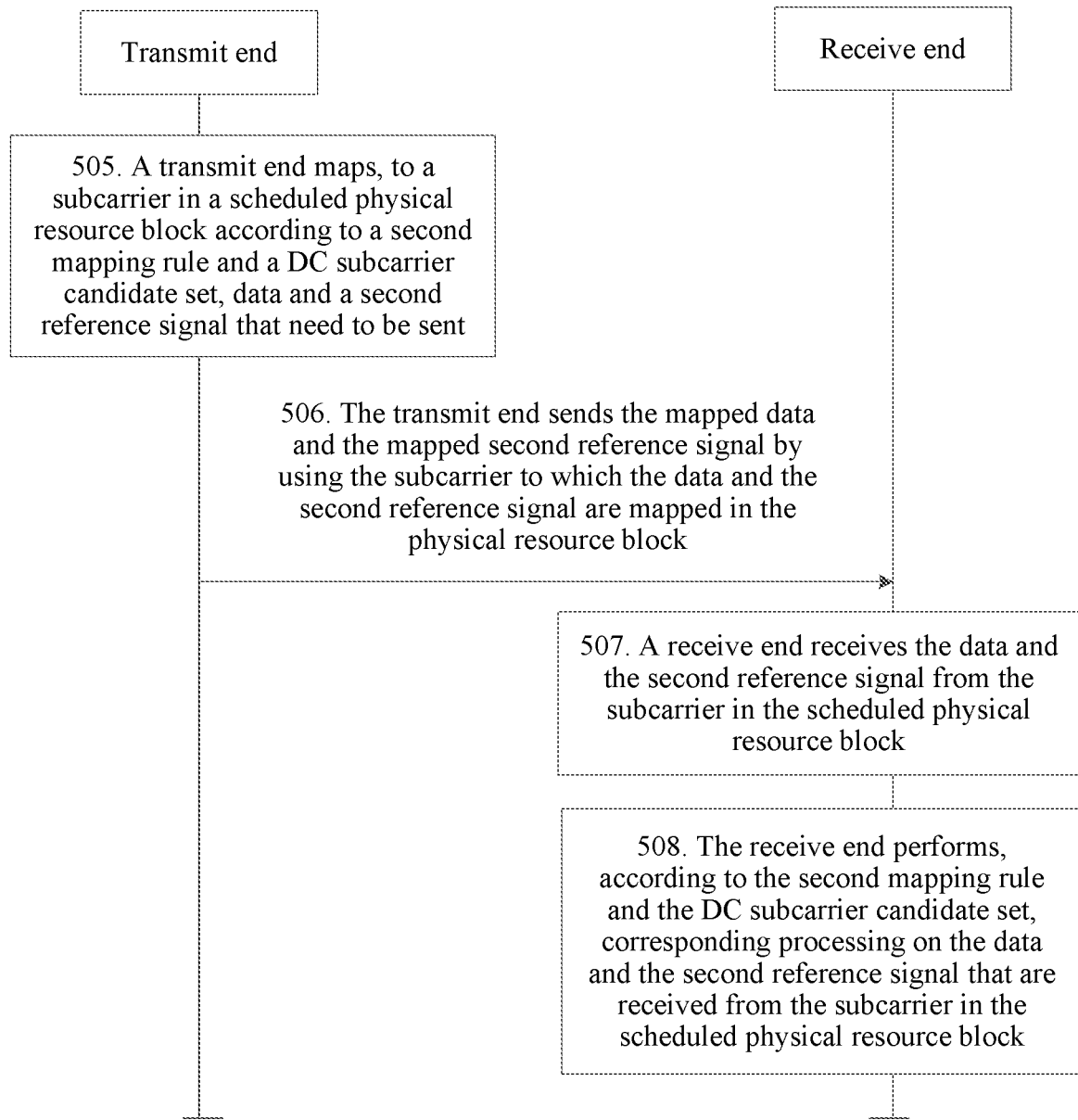
FIG. 8 is a flowchart of a data transceiving method according to another embodiment of this application.

FIG. 8 is a flowchart of a data transceiving method according to another embodiment of this application. A receive end in FIG. 8 may be user equipment that receives downlink data or may be a base station that receives uplink data. When the receive end is the user equipment, a corresponding transmit end is a base station. When the receive end is the base station, a corresponding transmit end is user equipment. The data transceiving method includes the following steps.

505. The transmit end maps, to a subcarrier in a scheduled physical resource block according to a second mapping rule and a DC subcarrier candidate set, data and a second reference signal that need to be sent.

The second mapping rule defines at least a manner of mapping the data and the second reference signal to a DC subcarrier. The second reference signal includes a DMRS.

Usually, the transmit end sends a demodulation reference signal when sending data, so that a receive end of the data can demodulate the received data based on the demodulation reference signal.

For example, the second mapping rule instructs to normally map the data to a DC subcarrier. In other words, when the scheduled physical resource block of the user equipment includes a DC subcarrier, to map the data and the second reference signal that need to be sent, the transmit end normally maps, to all subcarriers in the physical resource block that includes the DC subcarrier, the data and the second reference signal that need to be sent, without distinguishing between a DC subcarrier and a non-DC subcarrier in the physical resource block.

For another example, the second mapping rule instructs to map the data to 11 subcarriers in the physical resource block in which a DC subcarrier is located. In other words, when the scheduled physical resource block of the user equipment includes a DC subcarrier, to map the data and the second reference signal that need to be sent, the transmit end needs to perform, on a basis of the 11 subcarriers, rate matching on the data and the second reference signal that need to be sent on the physical resource block, and map, to the 11 subcarriers in the scheduled physical resource block, information obtained after the rate matching. None of the 11 subcarriers are DC subcarriers. The data and the second reference signal are not mapped to the DC subcarrier in the physical resource block.

In actual implementation, before mapping the data and the second reference signal, the transmit end first obtains the second mapping rule. There may be at least the following three manners of obtaining the second mapping rule.

In a first manner, the transmit end determines the second mapping rule based on the DC subcarrier candidate set.

When the transmit end is a base station, the base station may determine the second mapping rule based on the DC subcarrier candidate set. In this case, this manner may be implemented by the processor 31 in FIG. 5. When the transmit end is user equipment, the user equipment may determine the second mapping rule based on the DC subcarrier candidate set through predefinition. In this case, this manner may be implemented by the processor 41 in FIG. 6.

In actual implementation, after a DC subcarrier candidate set is determined, each of a base station and user equipment may be notified of the DC subcarrier candidate set through predefinition. Correspondingly, the base station or the user equipment may determine the second mapping rule based on the DC subcarrier candidate set.

In a second manner, when the transmit end is user equipment, the transmit end receives the second mapping rule that is notified by a base station through semi-static configuration or dynamic configuration, where the second mapping rule is determined and sent by the base station to the user equipment based on the DC subcarrier candidate set when the base station schedules the user equipment to send uplink data and the scheduled physical resource block includes a DC subcarrier of the user equipment. In this case, when the transmit end is user equipment, this manner may be implemented by the transceiver 32 in FIG. 5.

The base station may determine the second mapping rule based on the DC subcarrier candidate set. After determining the second mapping rule, the base station may further notify the user equipment of the second mapping rule through semi-static configuration or dynamic configuration.

The semi-static configuration manner herein means that the base station first notifies the user equipment of the second mapping rule at an initial access stage of the user equipment, and may not notify the user equipment of the second mapping rule again in a subsequent process, or notifies the user equipment of the second mapping rule again after a period of time during which the second mapping rule keeps valid, or notifies the user equipment of the second mapping rule at a time interval in a subsequent process, or notifies the user equipment of the second mapping rule again when some specified events are triggered.

The dynamic configuration manner herein means that the base station first notifies the user equipment of the second mapping rule each time the base station needs to send the data and the demodulation reference signal to the user equipment.

In the second manner, the second mapping rule notified by the base station to the user equipment defines a rule of mapping the data and the demodulation reference signal.

In a third manner, when the transmit end is user equipment, the transmit end receives a third mapping rule and a fourth mapping rule that are notified by a base station through semi-static configuration or dynamic configuration, and determines the second mapping rule according to the third mapping rule and the fourth mapping rule, where the third mapping rule defines a manner of mapping the data to a DC subcarrier, or the fourth mapping rule defines a manner of mapping the second reference signal to a DC subcarrier. When the transmit end is user equipment, this manner may be implemented by the transceiver 32 in FIG. 5.

Different from the second manner, in the third manner, the base station may separately notify the user equipment of a rule of mapping the data, for example, notify, by using the third mapping rule, the user equipment of the rule of mapping the data; or the base station may separately notify the user equipment of a rule of mapping the demodulation reference signal, for example, notify, by using the fourth mapping rule, the user equipment of the rule of mapping the demodulation reference signal. Correspondingly, after receiving the third mapping rule, the user equipment determines the rule of mapping the data; after receiving the fourth mapping rule, the user equipment determines the rule of mapping the demodulation reference signal; and then the user equipment combines the rule of mapping the data with the rule of mapping the demodulation reference signal, to obtain the rule of mapping the data and the demodulation reference signal, that is, obtain the second mapping rule.

Apparently, in the third manner, the user equipment may not combine the third mapping rule, namely the rule of mapping the data, with the fourth mapping rule, namely the rule of mapping the demodulation reference signal, but directly processes received information by using the rule of mapping the data and the rule of mapping the demodulation reference signal.

In actual application, the base station may alternatively notify the user equipment of the first mapping rule in another notification manner. Examples are not further enumerated herein.

When needing to send the data to the receive end, the transmit end first needs to preprocess the data and the demodulation reference signal, then perform rate matching on information obtained after the preprocessing, and map, to a non-DC subcarrier in the scheduled physical resource block, information obtained after the rate matching.

In actual implementation, after a scheduled physical resource block is determined, both a base station that needs to send downlink data and user equipment that needs to send uplink data may learn whether the physical resource block includes a DC subcarrier. When the scheduled physical resource block includes a DC subcarrier, a specific subcarrier that is a DC subcarrier in the physical resource block is determined based on the DC subcarrier candidate set, and then information that needs to be sent after rate matching is mapped to a subcarrier that is not a DC subcarrier and that is in the physical resource block.

When the transmit end is user equipment, step 505 may be performed by the processor 31 in FIG. 5. When the transmit end is a base station, step 505 may be performed by the processor 41 in FIG. 6.

506. The transmit end sends the mapped data and the mapped second reference signal by using the subcarrier to which the data and the second reference signal are mapped in the physical resource block.

When the transmit end is user equipment, step 506 may be performed by the transceiver 32 in FIG. 5. When the transmit end is a base station, step 506 may be performed by the transceiver 42 in FIG. 6.

507. The receive end receives the data and the second reference signal from the subcarrier in the scheduled physical resource block.

The scheduled physical resource block includes the subcarrier that carries the data and the second reference signal.

When the receive end is user equipment, step 507 may be performed by the transceiver 32 in FIG. 5. When the receive end is a base station, step 507 may be performed by the transceiver 42 in FIG. 6.

508. The receive end performs, according to the second mapping rule and the DC subcarrier candidate set, corresponding processing on the data and the second reference signal that are received from the subcarrier in the scheduled physical resource block.

In actual implementation, the receive end first needs to obtain the second mapping rule. There may be at least the following three manners of obtaining the second mapping rule by the receive end.

In a first manner, the receive end determines the second mapping rule based on the DC subcarrier candidate set.

When the receive end is a base station, the base station may determine the second mapping rule based on the DC subcarrier candidate set. This may be performed by the processor 31 in FIG. 5. When the receive end is user equipment, the user equipment may determine the second mapping rule based on the DC subcarrier candidate set through predefinition. This may be performed by the processor 41 in FIG. 6.

In actual implementation, after a DC subcarrier candidate set is determined, each of a base station and user equipment may be notified of the DC subcarrier candidate set through predefinition. Correspondingly, the base station or the user equipment may determine the second mapping rule based on the DC subcarrier candidate set.

In a second manner, when the receive end is user equipment, the receive end receives the second mapping rule that is notified by a base station through semi-static configuration or dynamic configuration, where the second mapping rule is determined and sent by the base station to the user equipment based on the DC subcarrier candidate set when the base station schedules the user equipment to send uplink data and the scheduled physical resource block includes a DC subcarrier of the user equipment. When the receive end is user equipment, this manner may be implemented by the transceiver 32 in FIG. 5.

The base station may determine the second mapping rule based on the DC subcarrier candidate set. After determining the second mapping rule, the base station may further notify the user equipment of the second mapping rule through semi-static configuration or dynamic configuration.

The semi-static configuration manner herein means that the base station first notifies the user equipment of the second mapping rule at an initial access stage of the user equipment, and may not notify the user equipment of the second mapping rule again in a subsequent process, or notifies the user equipment of the second mapping rule again after a period of time during which the second mapping rule keeps valid, or notifies the user equipment of the second mapping rule at a time interval in a subsequent process, or notifies the user equipment of the second mapping rule again when some specified events are triggered.

The dynamic configuration manner herein means that the base station first notifies the user equipment of the second mapping rule each time the base station needs to send the data and the demodulation reference signal to the user equipment.

In the second manner, the second mapping rule notified by the base station to the user equipment defines a rule of mapping the data and the demodulation reference signal.

In a third manner, when the receive end is user equipment, the receive end receives a third mapping rule and a fourth mapping rule that are notified by a base station through semi-static configuration or dynamic configuration, and determines the second mapping rule according to the third mapping rule and the fourth mapping rule, where the third mapping rule defines a manner of mapping the data to a DC subcarrier, or the fourth mapping rule defines a manner of mapping the second reference signal to a DC subcarrier. When the receive end is user equipment, this manner may be implemented by the transceiver 32 in FIG. 5.

Different from the second manner, in the third manner, the base station may separately notify the user equipment of a rule of mapping the data, for example, notify, by using the third mapping rule, the user equipment of the rule of mapping the data; or the base station may separately notify the user equipment of a rule of mapping the demodulation reference signal, for example, notify, by using the fourth mapping rule, the user equipment of the rule of mapping the demodulation reference signal. Correspondingly, after receiving the third mapping rule, the user equipment determines the rule of mapping the data; after receiving the fourth mapping rule, the user equipment determines the rule of mapping the demodulation reference signal; and then the user equipment combines the rule of mapping the data with the rule of mapping the demodulation reference signal, to obtain the rule of mapping the data and the demodulation reference signal, that is, obtain the second mapping rule.

Apparently, in the third manner, the user equipment may not combine the third mapping rule, namely the rule of mapping the data, with the fourth mapping rule, namely the rule of mapping the demodulation reference signal, but directly processes received information by using the rule of mapping the data and the rule of mapping the demodulation reference signal.

In actual application, the base station may alternatively notify the user equipment of the first mapping rule in another notification manner. Examples are not further enumerated herein.

That the receive end performs, according to the second mapping rule and the DC subcarrier candidate set, corresponding processing on the data and the second reference signal that are received from the subcarrier in the scheduled physical resource block includes at least the following two implementations:

In a first implementation, when the second mapping rule instructs to normally map the data to a DC subcarrier, the receive end determines a DC subcarrier in the physical resource block based on the DC subcarrier candidate set, and discards data that is on the DC subcarrier in the physical resource block. To be specific, the receive end performs puncturing on information on the DC subcarrier in the physical resource block and discards the information that is on the DC subcarrier. The information herein may be content related to the data or the demodulation reference signal.

In a second implementation, when the second mapping rule instructs to map the data to 11 subcarriers in the physical resource block in which a DC subcarrier is located, the receive end determines the DC subcarrier in the physical resource block based on the DC subcarrier candidate set, and performs rate matching and data demodulation on the physical resource block on a basis of the 11 subcarriers, where none of the 11 subcarriers are DC subcarriers.

When the receive end is user equipment, step 508 may be performed by the processor 31 in FIG. 5. When the receive end is a base station, step 508 may be performed by the processor 41 in FIG. 6.

In conclusion, according to the data transceiving method provided in this embodiment in this application, because the second mapping rule specifies the rule of mapping the data and the second reference signal, it can be ensured that the receive end can correctly demodulate the data and the second reference signal. In addition, because no additional DC subcarrier is set, but a subcarrier in the physical resource block is used as an idle subcarrier, that is, used as a DC subcarrier, a dynamic change of a quantity of downlink subcarriers in a system is avoided.

In actual implementation, the base station may be assigned permission to obtain a predefined second mapping rule while the user equipment is not given the permission to obtain the predefined second mapping rule. In this case, the base station may notify, based on scheduling, scheduled user equipment of the rule of mapping the data and the second reference signal, so that the base station can better perform scheduling and management.

In 5G New Radio (NR), a base station may directly modulate data on a DC subcarrier, without a need to perform rate matching or puncturing processing on the DC subcarrier. However, for user equipment that does not have a capability of processing interference from the DC subcarrier, if the user equipment receives data that is sent by the base station and that is carried on a DC subcarrier, the user equipment cannot effectively reduce interference brought by the DC subcarrier. As a result, performance in demodulating data that is modulated onto the DC subcarrier or a carrier near the DC subcarrier is directly affected. Therefore, in another embodiment of this application, the user equipment may further report, to the base station, whether the user equipment has a capability of correctly demodulating data that is modulated onto a DC subcarrier, and then the base station determines, based on the capability of the user equipment, whether data can be modulated onto a DC subcarrier. In this way, user equipment that has a limited capability of processing interference from a receiving DC subcarrier can correctly demodulate the data, thereby avoiding the interference brought by the DC subcarrier to the user equipment that has the limited capability. A data transceiving method according to the another embodiment of this application is described below in detail with reference to FIG. 9.

Figure 9:
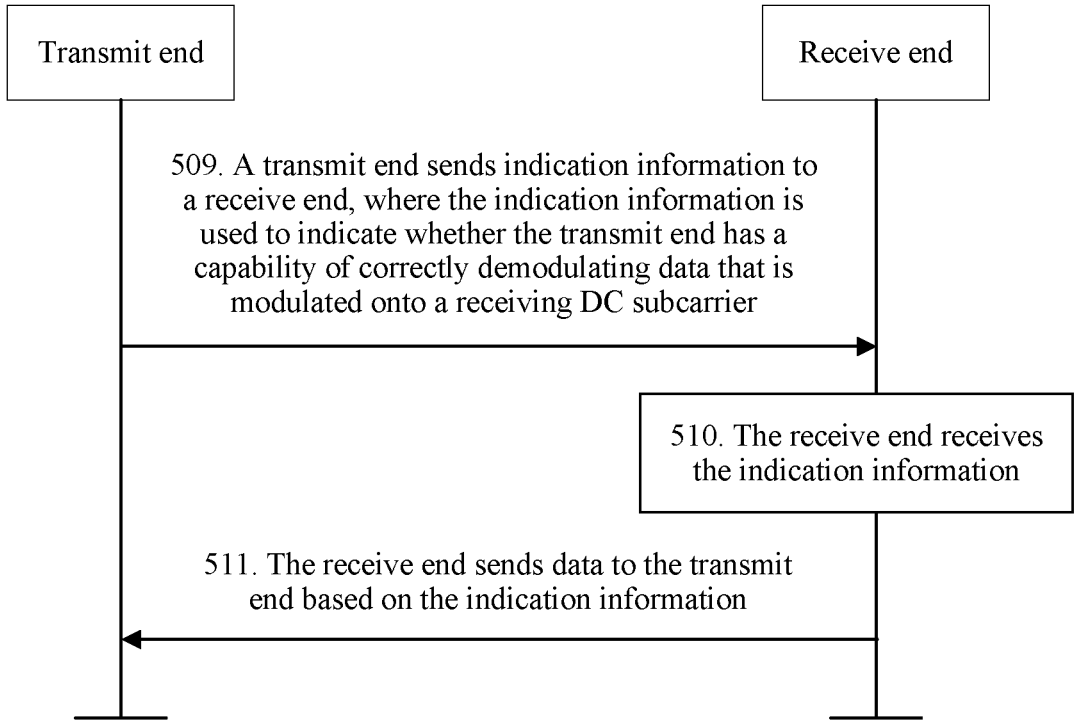
FIG. 9 is a flowchart of a data transceiving method according to another embodiment of this application.

FIG. 9 is a flowchart of a data transceiving method according to another embodiment of this application. A receive end in FIG. 9 may be a base station, and a transmit end is user equipment. For a structure of the user equipment, refer to FIG. 5. For a structure of the base station, refer to FIG. 6. The data transceiving method includes the following steps.

509. The transmit end sends indication information to the receive end, where the indication information is used to indicate whether the transmit end has a capability of correctly demodulating data that is modulated onto a DC subcarrier.

Step 509 may be performed by the transceiver 32 in FIG. 5.

510. The receive end receives the indication information.

511. The receive end sends data to the transmit end based on the indication information, where if the indication information indicates that the transmit end does not have the capability, a subcarrier that carries the data does not include a DC subcarrier.

Steps 510 and 511 may be performed by the transceiver 42 in FIG. 6.

It should be understood that if the indication information indicates that the transmit end has the capability, the subcarrier that carries the data may include a DC subcarrier. In other words, if the transmit end has the capability of correctly demodulating data that is modulated onto a DC subcarrier, the receive end may modulate data onto a DC subcarrier for transmission.

In other words, the receive end may learn, by receiving the indication information sent by the transmit end, whether the transmit end has the capability of correctly demodulating data that is modulated onto a DC subcarrier. If the transmit end can correctly demodulate data that is modulated onto a receiving DC subcarrier, when the receive end sends data to the transmit end, the receive end may modulate the data on the receiving DC subcarrier of the transmit end. If the transmit end cannot correctly demodulate data that is modulated onto a receiving DC subcarrier, when the receive end sends data to the transmit end, a location of a frequency domain resource occupied by the data in frequency domain should not be a location of the DC subcarrier.

Optionally, in step 510, the transmit end may send the indication information to the receive end during random access to a system. After the transmit end sends the indication information to the receive end during random access to the system, and the transmit end is connected to the system, the receive end may send the data to the transmit end based on the indication information, so that the user equipment that has the limited capability can correctly demodulate the data. For example, during random access to the system, the transmit end may report, to the receive end by using a random access preamble sequence or a third random access information (also referred to as an Msg3) signal, whether the transmit end can correctly demodulate data that is directly modulated onto the receiving DC subcarrier.

The user equipment reports, to the base station, whether the user equipment has the capability of correctly demodulating data that is modulated onto a DC subcarrier, and then the base station determines, based on the capability of the user equipment, whether the data can be modulated onto a DC subcarrier. In this way, user equipment that has a limited capability of processing interference from a receiving DC subcarrier can correctly demodulate the data, thereby avoiding the interference brought by the DC subcarrier to the user equipment that has the limited capability.

Figure 10:
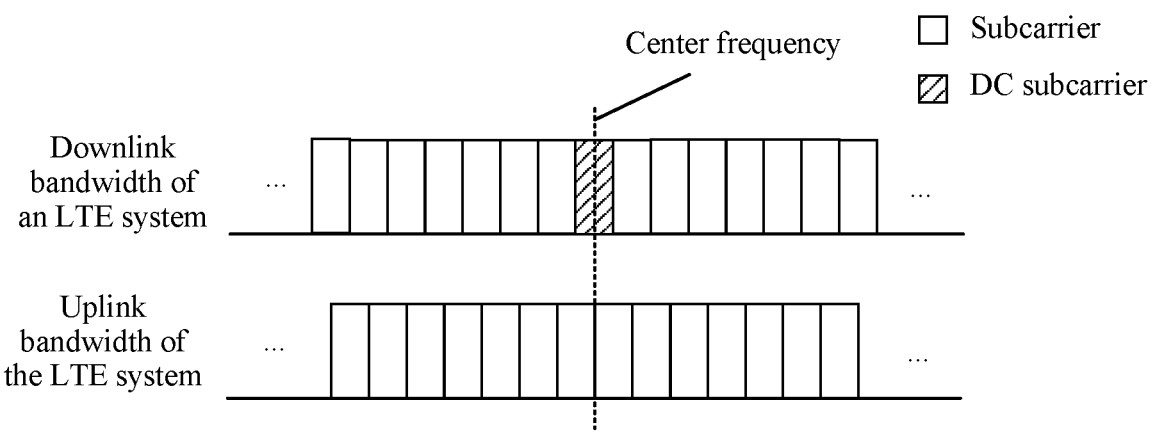
FIG. 10 is a schematic structural diagram of an LTE system bandwidth.

In an LTE system, a center frequency of a downlink bandwidth is located in the middle of a DC subcarrier, and a center frequency of an uplink bandwidth is located between two uplink subcarriers. As shown in FIG. 10, in the LTE system, an entire downlink subcarrier on the right side of a center frequency is shifted by half a subcarrier spacing to the right relative to an uplink subcarrier on the right side of the center frequency, and an entire downlink subcarrier on the left side of a center frequency is also shifted by half a subcarrier spacing to the left relative to an uplink subcarrier on the left side of the center frequency. A structure of an uplink bandwidth in an NR system is the same as a structure of the downlink bandwidth in the LTE system. When the NR system coexists with the LTE system, a subcarrier spacing in one of the two systems is consistent with that of the other system, and a frequency band in which one of the two systems is located is adjacent to or partially overlaps with a frequency band in which the other system is located, because within a same frequency band, a distance between an uplink subcarrier of the NR system and a center frequency is a 2n multiple of half the subcarrier spacing, and a distance between an uplink subcarrier of the LTE system and a center frequency is a 2n+1 multiple of half the subcarrier spacing, the uplink subcarrier of the NR system and the uplink subcarrier of the LTE system cannot be orthogonal to each other. Consequently, when the user equipment sends uplink data by using both the NR system and the LTE system, interference is caused. Herein, n is an integer greater than or equal to 0. Therefore, another embodiment of this application further provides a data transceiving method. When the NR system coexists with the LTE system, the subcarrier spacing in one of the two systems is consistent with that of the other system, and the frequency band in which one of the two systems is located is adjacent to or partially overlaps with the frequency band in which the other system is located, the base station may instruct the user equipment to shift the predefined uplink subcarrier of the NR system by an odd multiple of half the subcarrier spacing in a specified direction, where the specified direction is a direction in which the uplink subcarrier of the LTE system is shifted relative to the center frequency. In this way, mutual interference caused when the NR system coexists with the LTE system can be avoided. The data transceiving method according to the another embodiment of this application is described below in detail with reference to FIG. 11.

Figure 11:
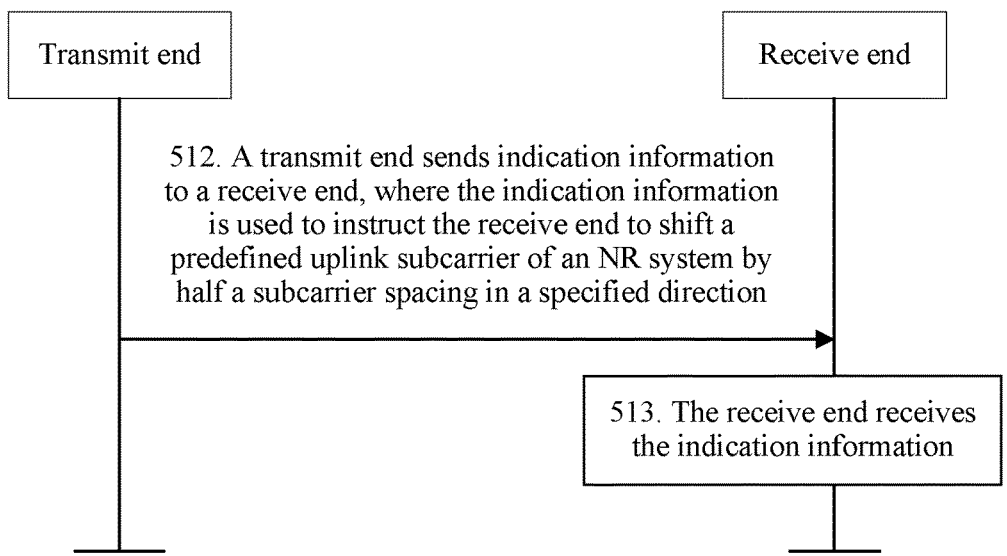
FIG. 11 is a flowchart of a data transceiving method according to another embodiment of this application.

FIG. 11 is a flowchart of a data transceiving method according to another embodiment of this application. A receive end in FIG. 11 may be user equipment, and a transmit end is a base station. For a structure of the user equipment, refer to FIG. 5. For a structure of the base station, refer to FIG. 6. The data transceiving method includes the following steps.

512. When an NR system coexists with an LTE system, a subcarrier spacing in the NR system is consistent with that in the LTE system, and a frequency band in which the NR system is located is adjacent to or partially overlaps with a frequency band in which the LTE system is located, the transmit end sends indication information to the receive end, where the indication information is used to instruct the receive end to shift a predefined uplink subcarrier of the NR system by an odd multiple of half the subcarrier spacing in a specified direction in frequency domain, and the specified direction is a direction in which an uplink subcarrier of the LTE system is shifted relative to a center frequency.

Step 512 may be performed by the transceiver 42 in FIG. 6.

513. The receive end receives the indication information.

Step 513 may be performed by the transceiver 32 in FIG. 5.

Optionally, in step 512, that the transmit end sends indication information to the receive end includes: sending, by the transmit end, a system message, higher layer signaling, or downlink control information to the receive end, where the system message, the higher layer signaling, or the downlink control information includes the indication information.

To be specific, within a same frequency band, for uplink transmission, when the NR system coexists with the LTE system, the subcarrier spacing in one of the two systems is consistent with that of the other system, and the frequency band in which one of the two systems is located is adjacent to or partially overlaps with the frequency band in which the other system is located, the transmit end may send the indication information by using the system message, the higher layer signaling, or the downlink control information. Correspondingly, the receive end receives the indication information added by the transmit end to the system message, the higher layer signaling, or the downlink control information, so that the receive end can determine to shift, by the odd multiple of half the subcarrier spacing in the specified direction, the predefined uplink subcarrier that is of the NR system and that is used to send uplink data. After the shifting, a distance between the uplink subcarrier of the NR system and the center frequency is a 2n+1 multiple of half the subcarrier spacing. In this way, the uplink subcarrier of the NR system and the uplink subcarrier of the LTE system can be orthogonal to each other, and mutual interference caused when the NR system coexists with the LTE system can be avoided.

Therefore, when the NR system coexists with the LTE system, the subcarrier spacing in one of the two systems is consistent with that of the other system, and the frequency band in which one of the two systems is located is adjacent to or partially overlaps with the frequency band in which the other system is located, the base station may instruct the user equipment to shift the predefined uplink subcarrier of the NR system by an odd multiple of half the subcarrier spacing in a specified direction, where the specified direction is a direction in which the uplink subcarrier of the LTE system is shifted relative to the center frequency. In this way, mutual interference caused when the NR system coexists with the LTE system can be avoided.

Figure 12:
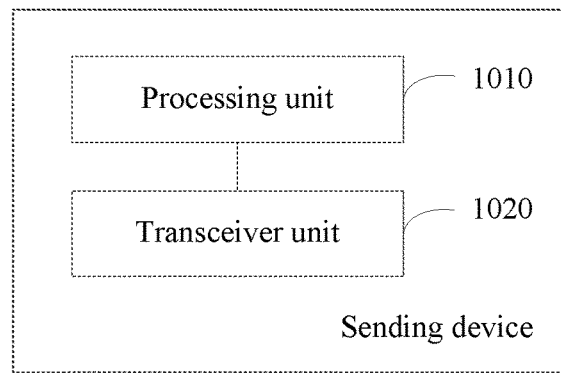
FIG. 12 is a block diagram of a sending device according to an embodiment of this application.

FIG. 12 is a schematic structural diagram of a sending device according to an embodiment of this application. The sending device may be a data transceiving apparatus, or may include a data transceiving apparatus. In other words, the data transceiving apparatus may become all or a part of the sending device by using software, hardware, or a combination thereof. The sending device may include a processing unit 1010 and a transceiver unit 1020.

The processing unit 1010 is configured to perform a function of at least one of step 501 and step 505.

The transceiver unit 1020 is configured to perform a function of at least one of step 502, step 506, step 509, and step 512.

For related details, refer to the foregoing method embodiments.

Optionally, in this embodiment of this application, when the sending device is user equipment, the processing unit 810 may be implemented by the processor 31 in FIG. 5, and the transceiver unit 1020 may be implemented by the transceiver 32 in FIG. 5; when the sending device is a base station, the processing unit 1010 may be implemented by the processor 41 in FIG. 6, and the transceiver unit 1020 may be implemented by the transceiver 42 in FIG. 6.

Figure 13:
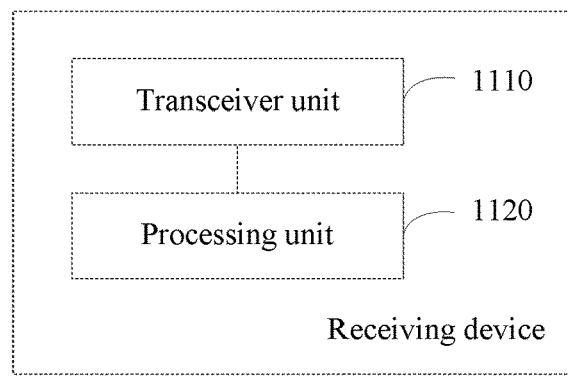
FIG. 13 is a block diagram of a receiving device according to an embodiment of this application.

FIG. 13 is a block diagram of a receiving device according to another embodiment of this application. The receiving device may be a data transceiving apparatus, or may include a data transceiving apparatus. In other words, the data transceiving apparatus may become all or a part of the receiving device by using software, hardware, or a combination thereof. The receiving device may include a transceiver unit 1110 and a processing unit 1120.

The transceiver unit 1110 is configured to perform a function of at least one of step 503, step 507, step 510, and step 513.

The processing unit 1120 is configured to perform a function of at least one of step 504 and step 508.

For related details, refer to the foregoing method embodiments.

Optionally, in this embodiment of this application, when the receiving device is user equipment, the transceiver unit 1110 may be implemented by the transceiver 32 in FIG. 5, and the processing unit 1120 may be implemented by the processor 31 in FIG. 5; when the receiving device is a base station, the transceiver unit 1110 may be implemented by the transceiver 42 in FIG. 6, and the processing unit 1120 may be implemented by the processor 41 in FIG. 6.

It should be noted that data transceiving of the data transceiving apparatus provided in the foregoing embodiments is described only by using an example of division of the foregoing function modules. In actual application, the foregoing functions can be allocated to different function modules and implemented according to a requirement. In other words, internal structures of the base station and the user equipment are divided into different function modules, to perform all or some of the functions described above. In addition, the data transceiving apparatus provided in the foregoing embodiments belongs to a same idea as the data transceiving method embodiments. For a specific implementation process of the data transceiving apparatus, refer to the method embodiments. Details are not described herein again.

It should be further noted that in this application, unless otherwise specified, all the sending devices may be referred to as a transmit end, and all the receiving devices may be referred to as a receive end.

An embodiment of this application further provides a data transceiving system. The data transceiving system includes the sending device shown in FIG. 12 and the receiving device shown in FIG. 13. For details, refer to the descriptions of FIG. 12 and FIG. 13. Details are not described herein again.

According to an embodiment, a data transceiving apparatus is provided, wherein the apparatus is embodied in a receive end and comprises: a transceiver unit, configured to receive a first reference signal transmitted on a subcarrier in a target physical resource block, wherein the first reference signal comprises a phase noise reference signal (PCRS); and a processing unit, configured to perform, according to a first mapping rule, corresponding processing on the first reference signal received from the subcarrier in the target physical resource block, wherein the first mapping rule defines at least mapping of the first reference signal to 10 specified subcarriers in a physical resource block, none of the 10 specified subcarriers are in a direct carrier (DC) subcarrier candidate set, and the DC subcarrier candidate set specifies numbers of carriers that are used as DC subcarriers in the physical resource block.

According to an embodiment, the processing unit is further configured to determine the first mapping rule based on the DC subcarrier candidate set; or the transceiver unit is further configured to: when the receive end is user equipment, receive the first mapping rule that is notified by a base station through semi-static configuration or dynamic configuration, wherein the first mapping rule is determined by the base station based on the DC subcarrier candidate set.

According to an embodiment, the candidate set comprises a subcarrier 0 and a subcarrier 5; or the candidate set comprises a subcarrier 0 and a subcarrier 6; or the candidate set comprises a subcarrier 11 and a subcarrier 5; or the candidate set comprises a subcarrier 11 and a subcarrier 6.

According to an embodiment, when the candidate set comprises the subcarrier 0 and the subcarrier 5, the first mapping rule defines mapping of the first reference signal to a subcarrier 1, a subcarrier 2, a subcarrier 3, a subcarrier 4, a subcarrier 6, a subcarrier 7, a subcarrier 8, a subcarrier 9, a subcarrier 10, and a subcarrier 11 among 12 subcarriers in the physical resource block; when the candidate set comprises the subcarrier 0 and the subcarrier 6, the first mapping rule defines mapping of the first reference signal to the subcarrier 0, a subcarrier 1, a subcarrier 2, a subcarrier 3, a subcarrier 4, a subcarrier 5, a subcarrier 7, a subcarrier 8, a subcarrier 9, a subcarrier 10, and a subcarrier 11 among 12 subcarriers in the physical resource block; when the candidate set comprises the subcarrier 11 and the subcarrier 5, the first mapping rule defines mapping of the first reference signal to a subcarrier 0, a subcarrier 1, a subcarrier 2, a subcarrier 3, a subcarrier 4, a subcarrier 6, a subcarrier 7, a subcarrier 8, a subcarrier 9, and a subcarrier 10 among 12 subcarriers in the physical resource block; or when the candidate set comprises the subcarrier 11 and the subcarrier 6, the first mapping rule defines mapping of the first reference signal to a subcarrier 0, a subcarrier 1, a subcarrier 2, a subcarrier 3, a subcarrier 4, a subcarrier 5, a subcarrier 7, a subcarrier 8, a subcarrier 9, and a subcarrier 10 among 12 subcarriers in the physical resource block.

According to an embodiment, the transceiver unit is further configured to receive data and a second reference signal from a subcarrier in a scheduled physical resource block, wherein the scheduled physical resource block comprises the subcarrier that carries the data and the second reference signal, and the second reference signal comprises a demodulation reference signal DMRS; and the processing unit is further configured to perform, according to a second mapping rule and the DC subcarrier candidate set, corresponding processing on the data and the second reference signal that are received from the subcarrier in the scheduled physical resource block, wherein the second mapping rule defines at least a manner of mapping the data and the second reference signal to a DC subcarrier.

According to an embodiment, the processing unit is further configured to determine the second mapping rule based on the DC subcarrier candidate set; or the transceiver unit is further configured to: when the receive end is user equipment, receive the second mapping rule that is notified by a base station through semi-static configuration or dynamic configuration, wherein the second mapping rule is determined and sent by the base station to the user equipment based on the DC subcarrier candidate set when the base station schedules the user equipment to receive downlink data and the scheduled physical resource block comprises a DC subcarrier of the user equipment; or the transceiver unit is further configured to: when the receive end is user equipment, receive a third mapping rule and a fourth mapping rule that are notified by a base station through semi-static configuration or dynamic configuration, and determine the second mapping rule according to the third mapping rule and the fourth mapping rule, wherein the third mapping rule defines a manner of mapping the data to a DC subcarrier, or the fourth mapping rule defines a manner of mapping the second reference signal to a DC subcarrier.

According to an embodiment, the processing unit is further configured to: when the second mapping rule instructs to normally map the data to a DC subcarrier, determine a DC subcarrier in the physical resource block based on the DC subcarrier candidate set, and discard data that is on the DC subcarrier in the physical resource block; or the processing unit is further configured to: when the second mapping rule instructs to map the data to 11 subcarriers in the physical resource block in which a DC subcarrier is located, determine the DC subcarrier in the physical resource block based on the DC subcarrier candidate set, and perform rate matching and data demodulation on the physical resource block on a basis of the 11 subcarriers, wherein none of the 11 subcarriers are DC subcarriers.

According to an embodiment, the apparatus is a base station; the transceiver unit is further configured to receive indication information sent by a transmit end, wherein the indication information is used to indicate whether the transmit end has a capability of correctly demodulating data that is modulated onto a direct current DC subcarrier, and the transmit end is user equipment; and the transceiver unit is further configured to send data to the transmit end based on the indication information, wherein if the indication information indicates that the transmit end does not have the capability, a subcarrier that carries the data does not comprise a DC subcarrier.

According to an embodiment, the transceiver unit is configured to receive a random access preamble sequence or third random access information, wherein the random access preamble sequence or the third random access information is sent by the transmit end and comprises the indication information.

According to an embodiment, the transceiver unit is further configured to: when a New Radio NR system coexists with a Long Term Evolution LTE system, a subcarrier spacing in the NR system is consistent with that in the LTE system, and a frequency band in which the NR system is located is adjacent to or partially overlaps with a frequency band in which the LTE system is located, receive indication information sent by a transmit end, wherein the indication information is used to instruct the apparatus to shift a predefined uplink subcarrier of the NR system by an odd multiple of half the subcarrier spacing in a specified direction in frequency domain, and the specified direction is a direction in which an uplink subcarrier of the LTE system is shifted relative to a center frequency.

According to an embodiment, the transceiver unit is configured to receive a system message, higher layer signaling, or downlink control information, wherein the system message, the higher layer signaling, or the downlink control information is sent by the transmit end and comprises the indication information.

According to an embodiment, a data transceiving apparatus is provided, wherein the apparatus is applied to a transmit end and comprises: a processing unit, configured to map a first reference signal to a target physical resource block according to a first mapping rule, wherein the first reference signal comprises a phase noise reference signal PCRS; and a transceiver unit, configured to send the first reference signal by using the target physical resource block to which the first reference signal is mapped, wherein the first mapping rule defines at least mapping of the first reference signal to 10 specified subcarriers in a physical resource block, none of the 10 specified subcarriers are in a DC subcarrier candidate set, and the DC subcarrier candidate set specifies numbers of carriers that are used as DC subcarriers in the physical resource block.

According to an embodiment, the processing unit is further configured to determine the first mapping rule based on the DC subcarrier candidate set; or the transceiver unit is further configured to: when the transmit end is user equipment, receive the first mapping rule that is notified by a base station through semi-static configuration or dynamic configuration, wherein the first mapping rule is determined by the base station based on the DC subcarrier candidate set.

According to an embodiment, the candidate set comprises a subcarrier 0 and a subcarrier 5; or the candidate set comprises a subcarrier 0 and a subcarrier 6; or the candidate set comprises a subcarrier 11 and a subcarrier 5; or the candidate set comprises a subcarrier 11 and a subcarrier 6.

According to an embodiment, when the candidate set comprises the subcarrier 0 and the subcarrier 5, the first mapping rule defines mapping of the first reference signal to a subcarrier 1, a subcarrier 2, a subcarrier 3, a subcarrier 4, a subcarrier 6, a subcarrier 7, a subcarrier 8, a subcarrier 9, a subcarrier 10, and a subcarrier 11 among 12 subcarriers in the physical resource block; when the candidate set comprises the subcarrier 0 and the subcarrier 6, the first mapping rule defines mapping of the first reference signal to the subcarrier 0, a subcarrier 1, a subcarrier 2, a subcarrier 3, a subcarrier 4, a subcarrier 5, a subcarrier 7, a subcarrier 8, a subcarrier 9, a subcarrier 10, and a subcarrier 11 among 12 subcarriers in the physical resource block; when the candidate set comprises the subcarrier 11 and the subcarrier 5, the first mapping rule defines mapping of the first reference signal to a subcarrier 0, a subcarrier 1, a subcarrier 2, a subcarrier 3, a subcarrier 4, a subcarrier 6, a subcarrier 7, a subcarrier 8, a subcarrier 9, and a subcarrier 10 among 12 subcarriers in the physical resource block; or when the candidate set comprises the subcarrier 11 and the subcarrier 6, the first mapping rule defines mapping of the first reference signal to a subcarrier 0, a subcarrier 1, a subcarrier 2, a subcarrier 3, a subcarrier 4, a subcarrier 5, a subcarrier 7, a subcarrier 8, a subcarrier 9, and a subcarrier 10 among 12 subcarriers in the physical resource block.

According to an embodiment, the processing unit is further configured to map, to a subcarrier in a scheduled physical resource block according to a second mapping rule and the DC subcarrier candidate set, data and a second reference signal that need to be sent, wherein the second reference signal comprises a demodulation reference signal DMRS; and the transceiver unit is further configured to send the mapped data and the mapped second reference signal by using the subcarrier to which the data and the second reference signal are mapped in the physical resource block, wherein the second mapping rule defines at least a manner of mapping the data and the second reference signal to a DC subcarrier.

According to an embodiment, the processing unit is further configured to determine the second mapping rule based on the DC subcarrier candidate set; or the transceiver unit is further configured to: when the transmit end is user equipment, receive the second mapping rule that is notified by a base station through semi-static configuration or dynamic configuration, wherein the second mapping rule is determined and sent by the base station to the user equipment based on the DC subcarrier candidate set when the base station schedules the user equipment to send uplink data and the scheduled physical resource block comprises a DC subcarrier of the user equipment; or the transceiver unit is further configured to: when the transmit end is user equipment, receive a third mapping rule and a fourth mapping rule that are notified by a base station through semi-static configuration or dynamic configuration, and determine the second mapping rule according to the third mapping rule and the fourth mapping rule, wherein the third mapping rule defines a manner of mapping the data to a DC subcarrier, or the fourth mapping rule defines a manner of mapping the second reference signal to a DC subcarrier.

According to an embodiment, the transceiver unit is further configured to: when the second mapping rule instructs to normally map the data to a DC subcarrier, map, to all subcarriers in the scheduled physical resource block for transmission, the data and the second reference signal that need to be sent; or the transceiver unit is further configured to: when the second mapping rule instructs to map the data to 11 subcarriers in the physical resource block in which a DC subcarrier is located, perform, on a basis of the 11 subcarriers, rate matching on the data and the second reference signal that need to be sent on the physical resource block, and map, to the 11 subcarriers in the scheduled physical resource block for transmission, information that is obtained after the rate matching, wherein none of the 11 sub carriers are DC subcarriers.

According to an embodiment, the apparatus is user equipment; the transceiver unit is further configured to send indication information to a receive end, wherein the indication information is used to indicate whether the transmit end has a capability of correctly demodulating data that is modulated onto a direct current DC subcarrier, and the receive end is a base station; and the transceiver unit is further configured to receive data that is sent by the receive end based on the indication information, wherein if the transmit end does not have the capability, a subcarrier that carries the data does not comprise a DC subcarrier.

According to an embodiment, the transceiver unit is further configured to send a random access preamble sequence or third random access information to the receive end, wherein the random access preamble sequence or the third random access information comprises the indication information.

According to an embodiment, the transceiver unit is further configured to: when a New Radio NR system coexists with a Long Term Evolution LTE system, a subcarrier spacing in the NR system is consistent with that in the LTE system, and a frequency band in which the NR system is located is adjacent to or partially overlaps with a frequency band in which the LTE system is located, send indication information to a receive end, wherein the indication information is used to instruct the receive end to shift a predefined uplink subcarrier of the NR system by an odd multiple of half the subcarrier spacing in a specified direction in frequency domain, and the specified direction is a direction in which an uplink subcarrier of the LTE system is shifted relative to a center frequency.

According to an embodiment, the transceiver unit is configured to send a system message, higher layer signaling, or downlink control information to the receive end, wherein the system message, the higher layer signaling, or the downlink control information comprises the indication information.

According to an embodiment, a computer readable storage medium is provided that comprises an instruction, wherein when the instruction is executed on a computer, the computer performs the method according to any one of the above methods.

According to an embodiment, a computer program product is provided that comprises an instruction, wherein when the computer program product runs on a computer, the computer performs any one of the above methods.

The sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer readable storage medium. The storage medium may include: a read-only memory, a magnetic disk, an optical disc, or the like.

The foregoing descriptions are merely example embodiments of this application, but are not intended to limit this application. Any modification, equivalent replacement, or improvement made without departing from the spirit and principle of this application shall fall within the protection scope of this application.

What is claimed is:

1. A data transceiving method, wherein the method comprises:
   receiving, by a receive end, a first reference signal transmitted on a subcarrier in a target physical resource block, wherein the first reference signal comprises a phase noise compensation reference signal (PCRS); and
   performing, by the receive end, according to a first mapping rule, corresponding processing on the first reference signal received from the subcarrier in the target physical resource block, wherein the first mapping rule defines at least mapping of the first reference signal to 10 specified subcarriers in a physical resource block, none of the 10 specified subcarriers are in a direct carrier (DC) subcarrier candidate set, and the DC subcarrier candidate set specifies numbers of carriers that are used as DC subcarriers in the physical resource blocks;
   receiving, by the receive end, data and a second reference signal from a subcarrier in a scheduled physical resource block, wherein the scheduled physical resource block comprises the subcarrier that carries the data and the second reference signal, and the second reference signal comprises a demodulation reference signal (DMRS);
   determining, by the receive end, a second mapping rule based on the DC subcarrier candidate set, wherein the second mapping rule defines at least a manner of mapping the data and the second reference signal to a DC subcarrier; and
   performing, by the receive end, according to the second mapping rule and the DC subcarrier candidate set, corresponding processing on the data and the second reference signal that are received from the subcarrier in the scheduled physical resource block.

2. The method according to claim 1, wherein the method further comprises:
   determining, by the receive end, the first mapping rule based on the DC subcarrier candidate set; or
   when the receive end is a user equipment, receiving, by the receive end, the first mapping rule that is notified by a base station through semi-static configuration or dynamic configuration, wherein the first mapping rule is determined by the base station based on the DC subcarrier candidate set.

3. The method according to claim 1, wherein the performing, by the receive end according to the second mapping rule and the DC subcarrier candidate set, corresponding processing on the data and the second reference signal that are received from the subcarrier in the scheduled physical resource block comprises:
   when the second mapping rule instructs to normally map the data to a DC subcarrier, determining, by the receive end, a DC subcarrier in the physical resource block based on the DC subcarrier candidate set, and discarding data that is on the DC subcarrier in the physical resource block; or
   when the second mapping rule instructs to map the data to 11 subcarriers in the physical resource block in which a DC subcarrier is located, determining, by the receive end, the DC subcarrier in the physical resource block based on the DC subcarrier candidate set, and performing rate matching and data demodulation on the physical resource block on a basis of the 11 subcarriers, wherein none of the 11 subcarriers are DC subcarriers.

4. The method according to claim 1, wherein the receive end is a base station, and the method further comprises:
   receiving, by the receive end, indication information sent by a transmit end, wherein the indication information is used to indicate whether the transmit end has a capability of correctly demodulating data that is modulated onto a DC subcarrier, and the transmit end is user equipment; and
   sending, by the receive end, data to the transmit end based on the indication information, wherein if the indication information indicates that the transmit end does not have the capability, a subcarrier that carries the data does not comprise a DC subcarrier.

33

5. The method according to claim 4, wherein the receiving, by the receive end, indication information sent by a transmit end comprises:
receiving, by the receive end, a random access preamble sequence or third random access information, wherein the random access preamble sequence or the third random access information is sent by the transmit end and comprises the indication information.

6. The method according to claim 1, wherein the method further comprises:
when a New Radio (NR) system coexists with a Long Term Evolution (LTE) system, a subcarrier spacing in the NR system is consistent with a subcarrier spacing in the LTE system, and a frequency band in which the NR system is located is adjacent to or partially overlaps with a frequency band in which the LTE system is located, receiving, by the receive end, indication information sent by a transmit end, wherein the indication information is used to instruct the receive end to shift a predefined uplink subcarrier of the NR system by an odd multiple of half the subcarrier spacing in a specified direction in frequency domain, and the specified direction is a direction in which an uplink subcarrier of the LTE system is shifted relative to a center frequency.

7. The method according to claim 6, wherein the receiving, by the receive end, indication information sent by a transmit end comprises:
receiving, by the receive end, a system message, higher layer signaling, or downlink control information, wherein the system message, the higher layer signaling, or the downlink control information is sent by the transmit end and comprises the indication information.

8. A data transceiving method, wherein the method comprises:
receiving, by a receive end, a first reference signal transmitted on a subcarrier in a target physical resource block, wherein the first reference signal comprises a phase noise compensation reference signal (PCRS); and
performing, by the receive end, according to a first mapping rule, corresponding processing on the first reference signal received from the subcarrier in the target physical resource block, wherein the first mapping rule defines at least mapping of the first reference signal to 10 specified subcarriers in a physical resource block, none of the 10 specified subcarriers are in a direct carrier (DC) subcarrier candidate set, and the DC subcarrier candidate set specifies numbers of carriers that are used as DC subcarriers in the physical resource block;
receiving, by the receive end, data and a second reference signal from a subcarrier in a scheduled physical resource block, wherein the scheduled physical resource block comprises the subcarrier that carries the data and the second reference signal, and the second reference signal comprises a demodulation reference signal (DMRS); and
performing, by the receive end, according to a second mapping rule and the DC subcarrier candidate set, corresponding processing on the data and the second reference signal that are received from the subcarrier in the scheduled physical resource block, wherein the second mapping rule defines at least a manner of mapping the data and the second reference signal to a DC subcarrier, wherein the method further comprises:
when the receive end is a user equipment, receiving, by the receive end, the second mapping rule that is notified

34 by a base station through semi-static configuration or dynamic configuration, wherein the second mapping rule is determined and sent by the base station to the user equipment based on the DC subcarrier candidate set when the base station schedules the user equipment to receive downlink data and the scheduled physical resource block comprises a DC subcarrier of the user equipment; or
when the receive end is the user equipment, receiving, by the receive end, a third mapping rule and a fourth mapping rule that are notified by a base station through semi-static configuration or dynamic configuration, and determining the second mapping rule according to the third mapping rule and the fourth mapping rule, wherein the third mapping rule defines a manner of mapping the data to a DC subcarrier, or the fourth mapping rule defines a manner of mapping the second reference signal to a DC subcarrier.

9. A data transceiving method, wherein the method comprises:
mapping, by a transmit end, a first reference signal to a target physical resource block according to a first mapping rule, wherein the first reference signal comprises a phase noise compensation reference signal (PCRS); and
sending, by the transmit end, the first reference signal using the target physical resource block to which the first reference signal is mapped, wherein
the first mapping rule defines at least mapping of the first reference signal to 10 specified subcarriers in a physical resource block, none of the 10 specified subcarriers are in a direct carrier (DC) subcarrier candidate set, and the DC subcarrier candidate set specifies numbers of carriers that are used as DC subcarriers in the physical resource blocks;
determining, by the transmit end, a second mapping rule based on the DC subcarrier candidate set, wherein the second mapping rule defines at least a manner of mapping the data and the second reference signal to a DC subcarrier;
mapping, by the transmit end to a subcarrier in a scheduled physical resource block according to the second mapping rule and the DC subcarrier candidate set, data and a second reference signal that need to be sent, wherein the second reference signal comprises a demodulation reference signal (DMRS); and
sending, by the transmit end, the mapped data and the mapped second reference signal using the subcarrier to which the data and the second reference signal are mapped in the physical resource block.

10. The method according to claim 9, wherein the method further comprises:
determining, by the transmit end, the first mapping rule based on the DC subcarrier candidate set; or
when the transmit end is a user equipment, receiving, by the transmit end, the first mapping rule that is notified by a base station through semi-static configuration or dynamic configuration, wherein the first mapping rule is determined by the base station based on the DC subcarrier candidate set.

11. The method according to claim 9, wherein the mapping, by the transmit end to a subcarrier in a scheduled physical resource block according to a second mapping rule and the DC subcarrier candidate set, data and a second reference signal that need to be sent comprises:
when the second mapping rule instructs to normally map the data to a DC subcarrier, mapping, by the transmit end to all subcarriers in the scheduled physical resource block, the data and the second reference signal that need to be sent; or when the second mapping rule instructs to map the data to 11 subcarriers in the physical resource block in which a DC subcarrier is located, performing, by the transmit end on a basis of the 11 subcarriers, rate matching on the data and the second reference signal that need to be sent on the physical resource block, and mapping, to the 11 subcarriers in the scheduled physical resource block, information that is obtained after the rate matching, wherein none of the 11 subcarriers are DC subcarriers.

12. The method according to claim 9, wherein the transmit end is user equipment, and the method further comprises:

sending, by the transmit end, indication information to a receive end, wherein the indication information is used to indicate whether the transmit end has a capability of correctly demodulating data that is modulated onto a direct current DC subcarrier, and the receive end is a base station; and receiving, by the transmit end, data that is sent by the receive end based on the indication information, wherein if the transmit end does not have the capability, a subcarrier that carries the data does not comprise a DC subcarrier.

13. The method according to claim 12, wherein the sending, by the transmit end, indication information to a receive end comprises:

sending, by the transmit end, a random access preamble sequence or third random access information to the receive end, wherein the random access preamble sequence or the third random access information comprises the indication information.

14. The method according to claim 9, wherein the method further comprises:

when a New Radio (NR) system coexists with a Long Term Evolution (LTE) system, a subcarrier spacing in the NR system is consistent with a subcarrier spacing in the LTE system, and a frequency band in which the NR system is located is adjacent to or partially overlaps with a frequency band in which the LTE system is located, sending, by the transmit end, indication information to a receive end, wherein the indication information is used to instruct the receive end to shift a predefined uplink subcarrier of the NR system by an odd multiple of half the subcarrier spacing in a specified direction in frequency domain, and the specified direction is a direction in which an uplink subcarrier of the LTE system is shifted relative to a center frequency.

15. The method according to claim 14, wherein the sending, by the transmit end, indication information to a receive end comprises:

sending, by the transmit end, a system message, higher layer signaling, or downlink control information to the receive end, wherein the system message, the higher layer signaling, or the downlink control information comprises the indication information.

16. A data transceiving method, wherein the method comprises:

mapping, by a transmit end, a first reference signal to a target physical resource block according to a first mapping rule, wherein the first reference signal comprises a phase noise compensation reference signal (PCRS); and sending, by the transmit end, the first reference signal using the target physical resource block to which the first reference signal is mapped, wherein the first mapping rule defines at least mapping of the first reference signal to 10 specified subcarriers in a physical resource block, none of the 10 specified subcarriers are in a direct carrier (DC) subcarrier candidate set, and the DC subcarrier candidate set specifies numbers of carriers that are used as DC subcarriers in the physical resource block;

mapping, by the transmit end to a subcarrier in a scheduled physical resource block according to a second mapping rule and the DC subcarrier candidate set, data and a second reference signal that need to be sent, wherein the second reference signal comprises a demodulation reference signal (DMRS); and sending, by the transmit end, the mapped data and the mapped second reference signal using the subcarrier to which the data and the second reference signal are mapped in the physical resource block, wherein the second mapping rule defines at least a manner of mapping the data and the second reference signal to a DC subcarrier; wherein the method further comprises:

when the transmit end is a user equipment, receiving, by the transmit end, the second mapping rule that is notified by a base station through semi-static configuration or dynamic configuration, wherein the second mapping rule is determined and sent by the base station to the user equipment based on the DC subcarrier candidate set when the base station schedules the user equipment to send uplink data and the scheduled physical resource block comprises a DC subcarrier of the user equipment; or when the transmit end is the user equipment, receiving, by the transmit end, a third mapping rule and a fourth mapping rule that are notified by a base station through semi-static configuration or dynamic configuration, and determining the second mapping rule according to the third mapping rule and the fourth mapping rule, wherein the third mapping rule defines a manner of mapping the data to a DC subcarrier, or the fourth mapping rule defines a manner of mapping the second reference signal to a DC subcarrier.

17. A data transceiving apparatus, wherein the apparatus is embodied in a receive end and comprises:

a transceiver unit, configured to receive a first reference signal transmitted on a subcarrier in a target physical resource block, wherein the first reference signal comprises a phase noise compensation reference signal (PCRS); and a processing unit, configured to perform, according to a first mapping rule, corresponding processing on the first reference signal received from the subcarrier in the target physical resource block, wherein the first mapping rule defines at least mapping of the first reference signal to 10 specified subcarriers in a physical resource block, none of the 10 specified subcarriers are in a direct carrier (DC) subcarrier candidate set, and the DC subcarrier candidate set specifies numbers of carriers that are used as DC subcarriers in the physical resource block;

wherein the transceiver unit is further configured to receive data and a second reference signal from a subcarrier in a scheduled physical resource block, wherein the scheduled physical resource block comprises the subcarrier that carries the data and the second reference signal, and the second reference signal comprises a demodulation reference signal (DMRS);

wherein the processing unit is further configured to:
  determine a second mapping rule based on the DC subcarrier candidate set, wherein the second mapping rule defines at least a manner of mapping the data and the second reference signal to a DC subcarrier; and
  perform, according to the second mapping rule and the DC subcarrier candidate set, corresponding processing on the data and the second reference signal that are received from the subcarrier in the scheduled physical resource block.

18. The apparatus according to claim 17, wherein
the processing unit is further configured to determine the first mapping rule based on the DC subcarrier candidate set; or
the transceiver unit is further configured to: when the receive end is a user equipment, receive the first mapping rule that is notified by a base station through semi-static configuration or dynamic configuration, wherein the first mapping rule is determined by the base station based on the DC subcarrier candidate set.

* * * * *

UNITED STATES PATENT AND TRADEMARK OFFICE
CERTIFICATE OF CORRECTION

PATENT NO. : 10,855,509 B2
APPLICATION NO. : 16/273660
DATED : December 1, 2020
INVENTOR(S) : Xue et al.

It is certified that error appears in the above-identified patent and that said Letters Patent is hereby corrected as shown below:

In the Claims

Claim 1, Column 32, Line 5: "blocks;" should read -- block; --.

Claim 9, Column 34, Line 35: "blocks;" should read -- block; --.

Signed and Sealed this
Thirty-first Day of May, 2022

Katherine Kelly Vidal
*Director of the United States Patent and Trademark Office*